May 30, 1967 A. BROOKS ETAL 3,322,941
SYNCHRO TO DIGITAL CONVERTOR
Filed Feb. 24, 1964 19 Sheets-Sheet 10

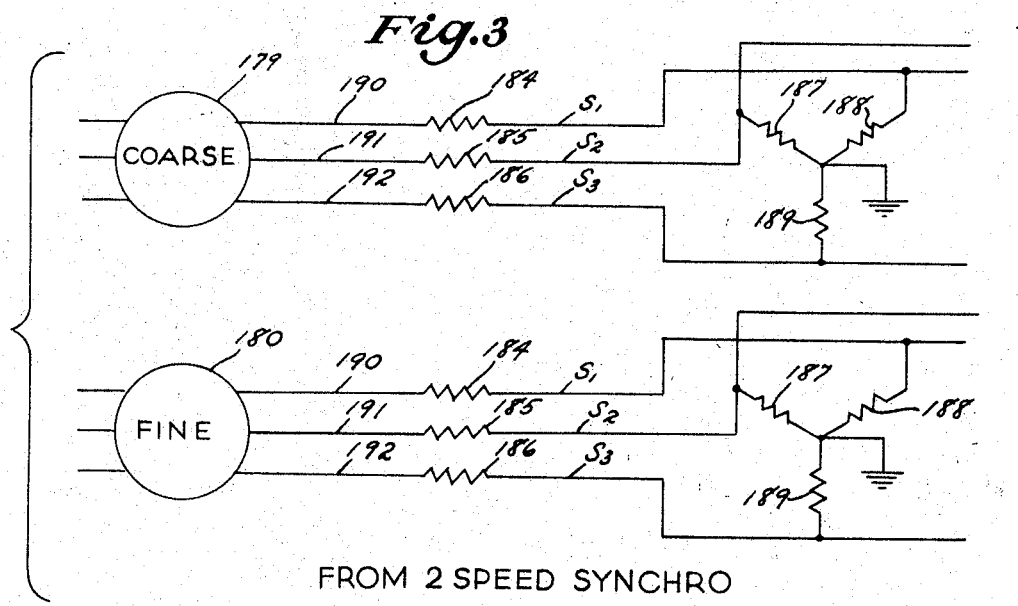
FROM 2 SPEED SYNCHRO
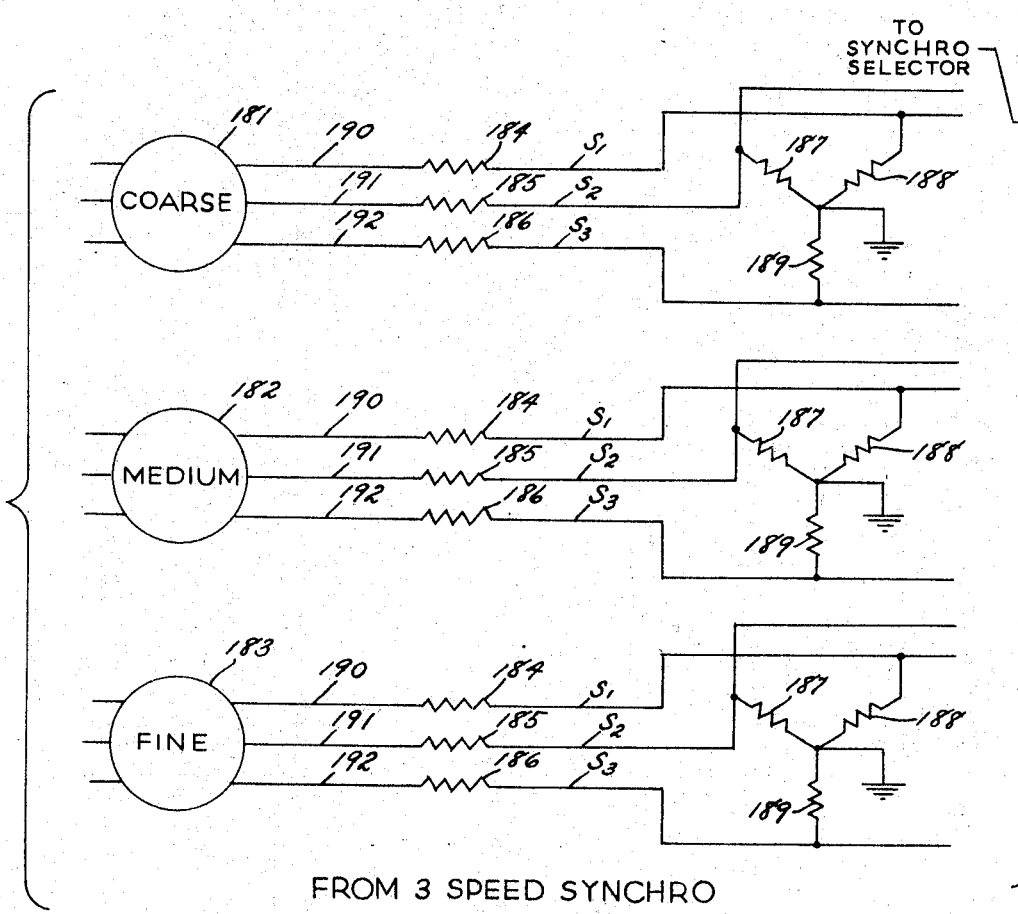
FROM 3 SPEED SYNCHRO

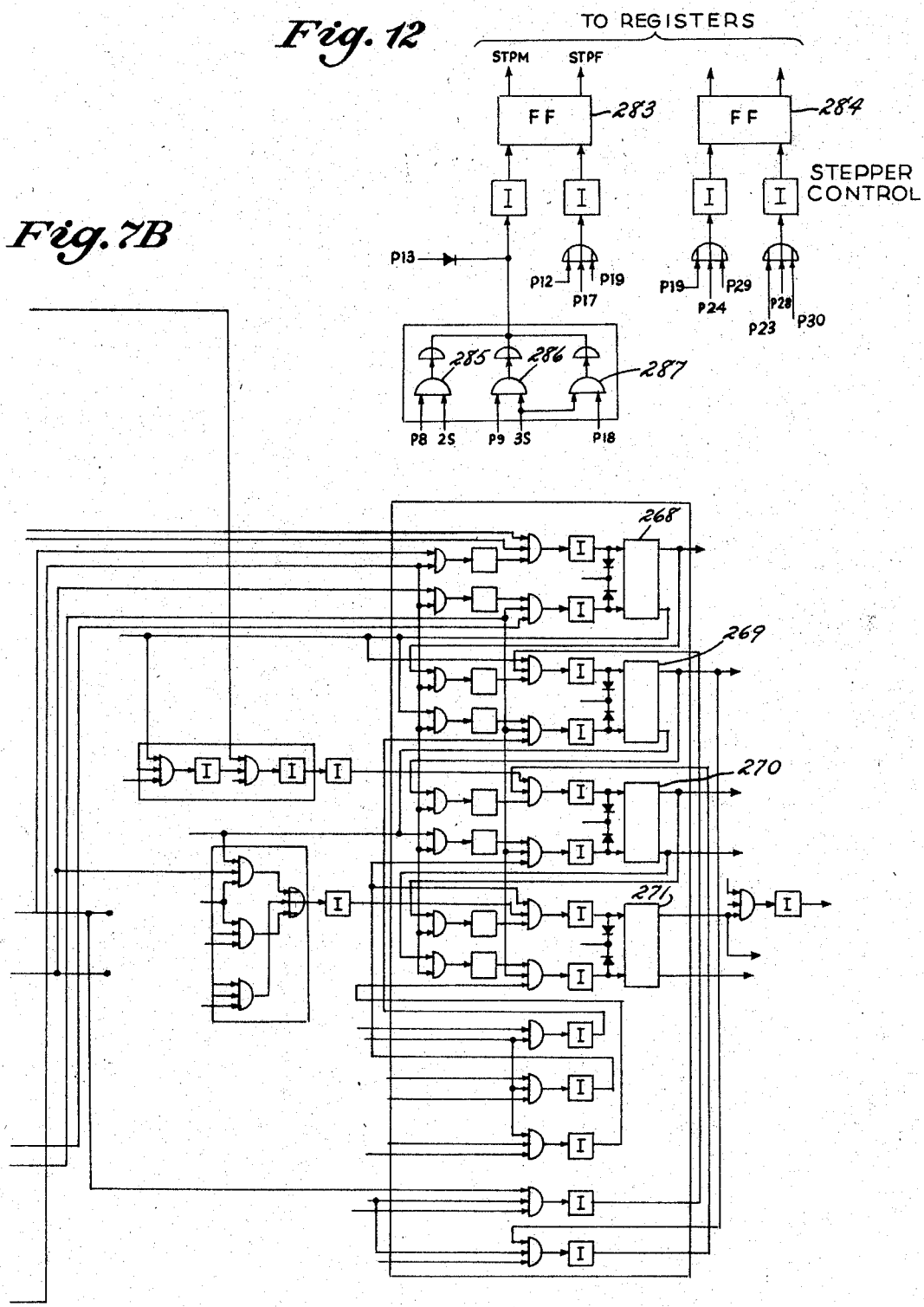

FROM RATIO SELECTOR
BUFFER
TO COMPARATOR

- ACTUAL (N+Z)
- APPEARANT (N+1)
- ACTUAL TAP FOR TRANSMITTER POSITION OF N+1
- EQUIVALENT POSITION
- ACTUAL TAP FOR TRANSMITTER POSITION OF N

TO REGISTER
SUM
SUM
FULL ADDER SUBTRACTOR
FF
FNG
ADDER
CARRY FINE
CARRY COARSE

May 30, 1967 A. BROOKS ETAL 3,322,941
SYNCHRO TO DIGITAL CONVERTOR
Filed Feb. 24, 1964 19 Sheets-Sheet 12

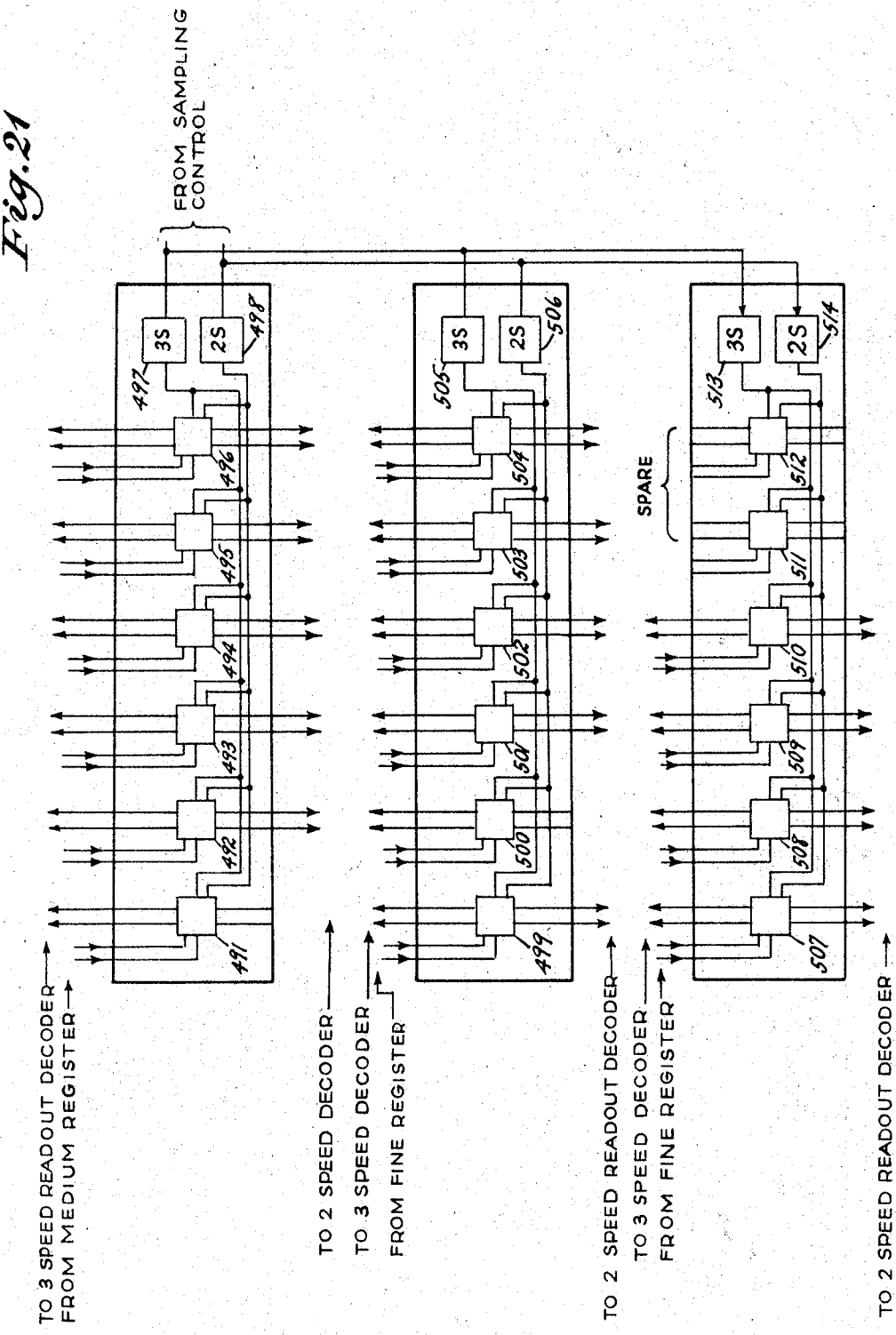

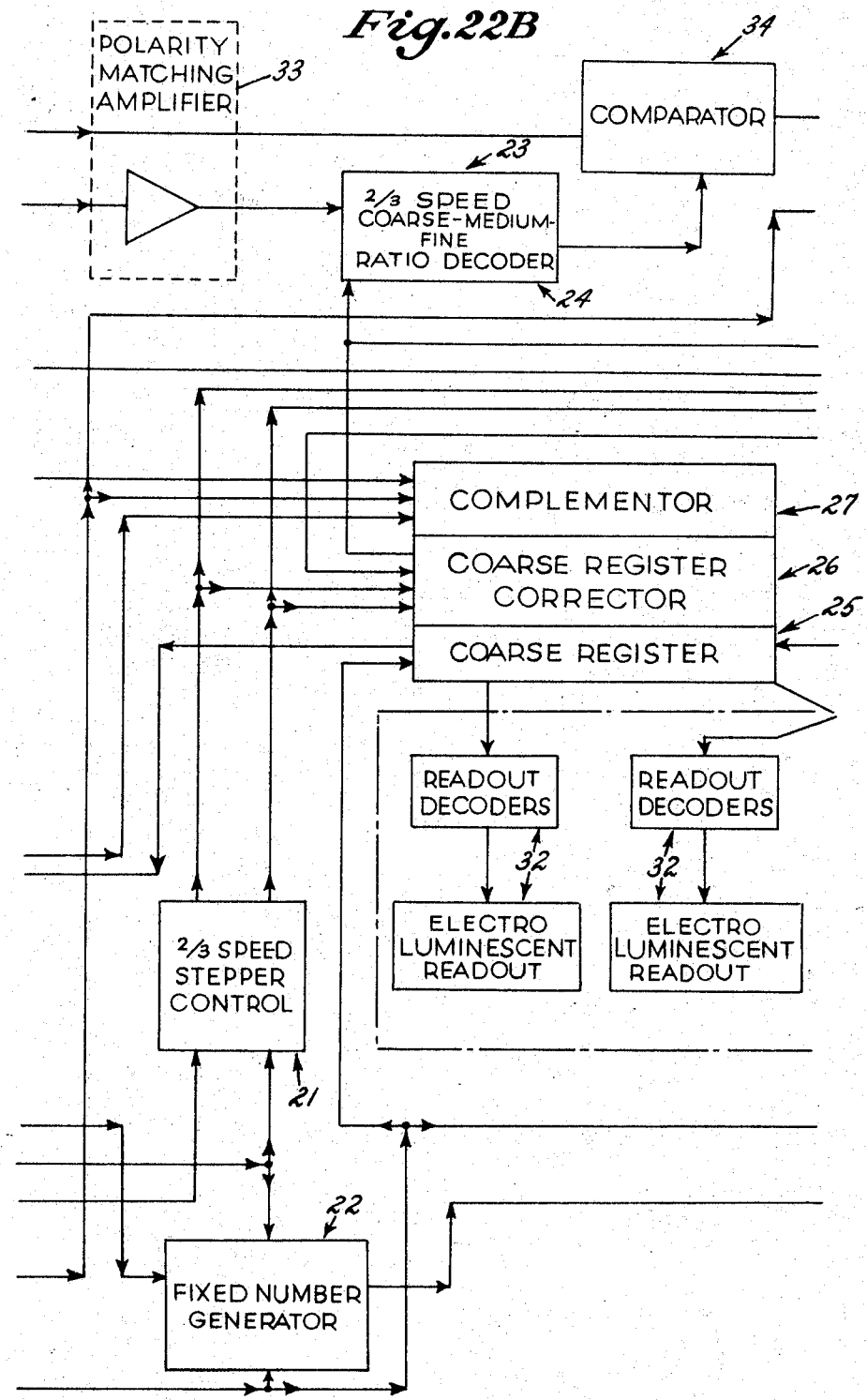

United States Patent Office 3,322,941
Patented May 30, 1967

3,322,941
SYNCHRO TO DIGITAL CONVERTOR
Alvin Brooks, Valley Cottage, Gerald Glatt, New York, Arthur Lehrer, Bayside, and Gordon Silverman, Jackson Heights, N.Y., assignors to Loral Electronics Corporation, New York, N.Y., a corporation of New York
Filed Feb. 24, 1964, Ser. No. 346,682
2 Claims. (Cl. 235—154)

This invention relates generally to the field of electronic computers, of a type employed for converting analogue information supplied by driven synchros to digital form.

In most digital mechanisms, input information is presented in the form of a digital number, usually represented as a group of wires, with one of the discrete levels on each wire. Since most synchros produce a continuous output, it is necessary to convert this output into the proper digital form so that the resultant function will be compatible with a digital device. The present disclosure relates to a device which will accept electrical information from a synchro transmitter, synchro differential transmitter, or other similar device, and convert this information into a binary coded decimal output. It is simpler in construction than are prior art devices based on similar principles.

It is among the principal objects of the present invention to provide an improved synchro to digital convertor of the class described which employs a unique means for determining the exact shaft position of transmitters in multiple speed systems where misalignment between the various transmitter components would ordinarily produce large errors.

Another object of the invention lies in the provision of a device of the class described which will display the transmitter shaft transmission directly in engineering units representatives of the transmitter function, such as degrees, or yards, including mixed functions, such as degrees and minutes.

Another object of the invention lies in the provision of means for the encoding of multiple speed functions, with a different speed for each function, and in which the different functions may represent different systems of units.

A further object of the invention lies in the provision of means for the encoding of multiple speed functions where, within a multiple speed system, the units may represent a system of units in which mixed ratios which are not units of ten may be employed.

Yet another object of the invention lies in the provision of means for the encoding and display of multiple speed transmissions directly into engineering units, rather than other systems such as binary systems where considerable computation is subsequently necessary to convert the systems to an equivalent engineering unit.

A further object of the invention lies in the provision of means for eliminating the possibility of gross machine errors in the determination of the attenuation points, so as to effectively cancel the effect of these errors.

Still another object of the present invention lies in the provision of an improved synchro to digital convertor in which the electronic components have been reduced to a basic minimum consistent with functions performed.

These objects, as well as other incidental ends and advantages, will more fully appear in the progress of the following disclosure, and be pointed out in the appended claims.

Before entering into a detailed consideration of the structural aspects of the disclosed embodiment, the following discussion is believed apposite.

A method generally used to convert an analogue voltage into a digital quantity is that of sequential comparison of the decoded digital quantity and the original analogue signal. Consider the following example, where all voltages from zero to sixteen volts are to be encoded to the nearest volt. In essence, this encoding program can be accomplished by comparing the input voltage signal against a 16-volt reference scale located in the encoder. To minimize the time required to do this, a comparison, at first, of half the reference scale is made against the input scale. (For purposes of this example, assume the input quantity to be nine volts.) On any comparison, if the input signal is greater than or equal to the reference signal, a bistable element will be set to a "one" state in order to "remember" this. Since half the reference scale is less than nine volts, the first bistable element is set to one. Next, the input is compared against $3/4$ of the reference scale (twelve volts). This time, the result of the comparison is that the reference is greater than the input. Hence, the second bistable element remains zero, and the input is next compared to $1/2$ plus $1/8$, or $10/16$, of the reference. Again the result leaves the bistable elements set at zero. The succeeding comparison is against $1/2$ plus $1/16$, or $9/16$, of the reference scale, and since the input is equal to $9/16$ of the reference, the fourth bistable element is set to one. No further comparisons are necessary, since $9/16$ of the scale represents $9/16$ of sixteen volts, or nine volts, and it is only necessary to encode to the nearest volt measurement. The result of this sequential comparison is stored in the set of bistable elements, as 1001. This is binary 9, which is the digital representation of the 9-volt input that was to be encoded. To generalize the above example for any quantity, first sequentially a number of bistable elements are set; then decoded (or the digital representation is converted to an equivalent analogue quantity); and compared to the input. The comparison reference is $1/2 \pm 1/4 \pm 1/8 \pm 1/16 \pm \cdots \pm 1/2^n$, (n) depending upon the extent to which the input must be resolved, where each sign depends on the result of the previous comparison. If the output is greater than the input, then the next sign is minus. If the comparison indicates that the output is less than or equal to the input, the subsequent sign is plus.

To illustrate how this technique is applied to the problem of a synchro transmitter, consider the stator output voltages as a function of transmitter shaft position for every 60° increment from 0° to 360°. Two of the stator outputs are of one polarity, while the third is of the opposite polarity. These six results are unique in that there are no increments in which the same two stators are of the same polarity. Consequently, the polarities of the stator outputs (as compared to the polarity of the synchro reference signal) can be used to determine within which one of the six sectors from 0° to 360° the shaft is located. Further, within each sector, the ratio of the stator voltage which starts at zero (for that sector) to the stator voltage which reaches 1 (for that sector) is a trigonometric function of the form $$\text{Ratio} = \frac{2 \tan a}{\tan + \sqrt{3}}$$

where $a$ is the incremental angle with each sector of the synchro transmitter shaft position. Using the sector information and the angle within the sector, the position of the transmitter shaft may be encoded to any desired accuracy and resolution. The encoding process for the case of a synchro transmitter is accomplished in the same way as was illustrated in the previous example, with one exception. Instead of comparing the input against a reference scale directly, one of the two stators selected (for each 60° sector) is used as the reference and the other stator is compared against this in accordance with their functional relationship.

In the present invention, it is contemplated to accommodate the translation of range and bearing information into usable form for digital computers, without loss of engineering units (yards in the case of range; and degrees, minutes and seconds in the case of bearings). The invention contemplates the use of both two-speed (coarse and fine) as well as three-speed (fine, medium and coarse) synchros, which are interconnected on a time-sharing basis. Because of the electrical similarity of the two-speed and three-speed evaluations, it is possible to time-share much of the circuitry by first performing the two-speed operation, entering the results in a memory readout, and then performing the three-speed operation. These operations are performed in approximately 1200 microseconds at ½-second sampling intervals. The program implementation may be constructed so that the program path followed will evaluate either two-speed or three-speed data in the same number of program steps (30), depending upon the control signals received. This minimizes the number of program steps that must be generated.

With the foregoing discussion in mind, reference may now be had to the accompanying drawings, in which:

FIGURE 3 is a schematic view illustrating the inputs to the fine and coarse synchros, comprising part of the synchro selector.

FIGURES 7A and 7B are a schematic wiring diagram of the fine register.

FIGURE 12 is a schematic diagram of the two- and three-speed stepper control.

FIGURE 21 is a schematic wiring diagram showing readout devices.

FIGURES 22A, 22B and 22C are a schematic wiring diagram of the entire device.

Figure 22A:
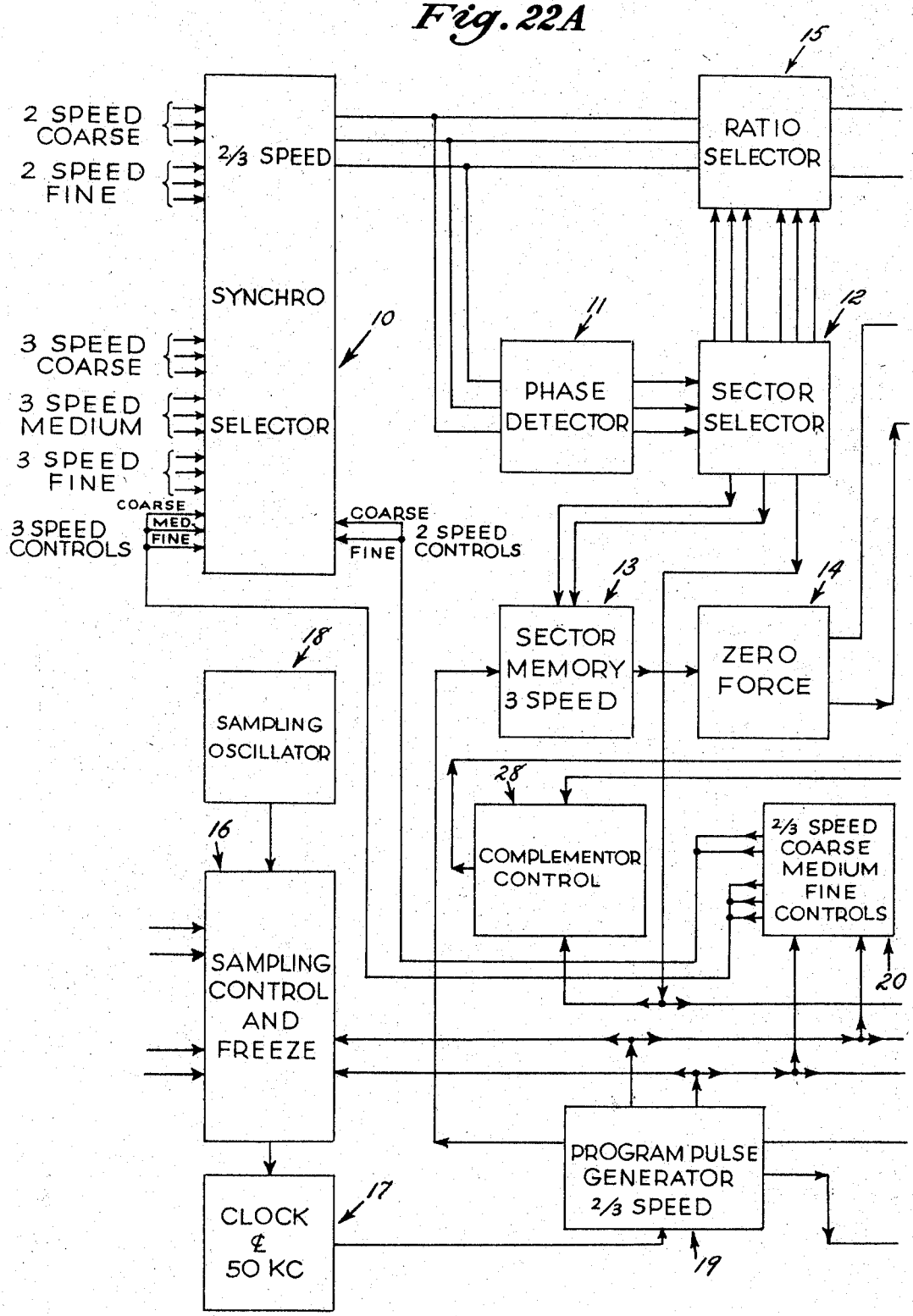
Figure 22C:
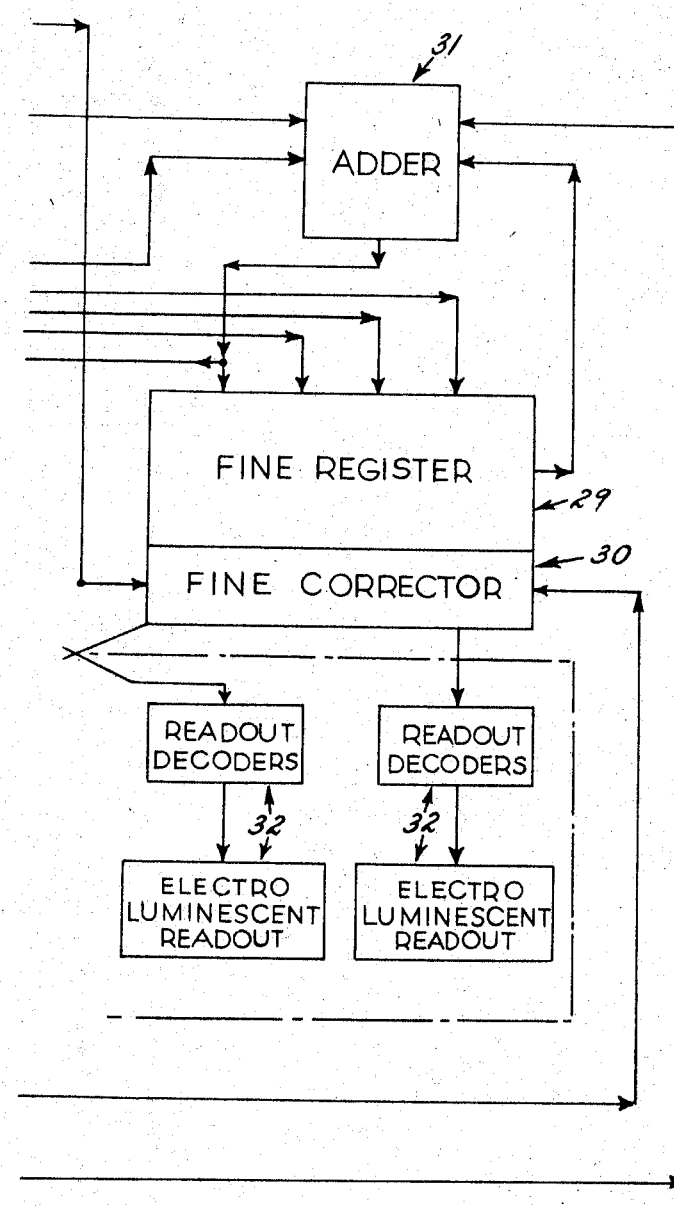

In accordance with the invention, the device, as shown in FIGURES 22A, 22B and 22C, comprises broadly: a synchro selector 10; a phase detector 11; a sector selector 12; sector memory 13; zero force control detector 14; ratio selector 15; sampling and freeze control 16; a clock 17; a sampling oscillator 18; a program pulse generator 19; two- and three-speed coarse, medium and fine controls 20; two- and three-speed stepper control 21; a fixed number generator 22; two- and three-speed coarse-medium ratio decoder 23; two- and three-speed fine ratio recorder 24; a coarse register 25; coarse corrector control 26; a complementor 27; a complementor control 28; a fine register 29; a fine corrector control 30; an adder 31; readout decoders and display device 32; a polarity matching amplifier 33; and a comparator 34.

A detailed operation of the device may best be understood by considering the sequence of computational events (the program) and the operation of each functional block.

Figure 1:
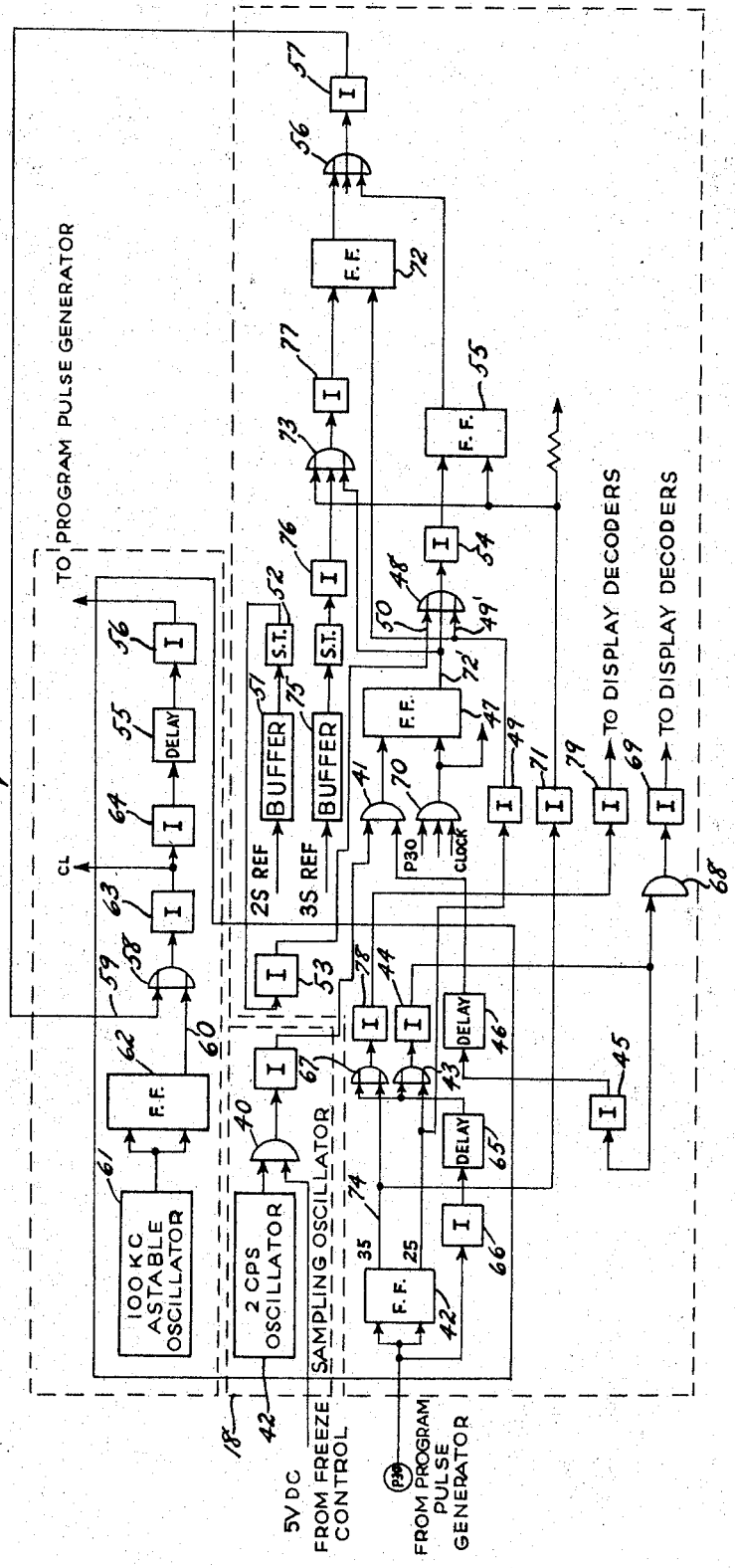
FIGURE 1 is an electrical schematic view of a sampling control comprising a part of an embodiment of the invention.

The program consists of a sequence of timed intervals. During each timed interval, either information is transmitted to appropriate places, or a part of the computation is performed. The complete computation occurs once every half second; that is to say, a two-speed computation and a three-speed computation are performed during this period. FIGURE 1 illustrates the typical sampling control logic. The two-cycle-per-second sampling oscillator 18 provides a signal which produces two positive transitions in voltage every second. Each time this oscillator makes a positive transition, a complete computation occurs. This consists of thirty timed intervals during which a bearing computation (two-speed) occurs, followed by a five-millisecond interval during which the results of the computation (bearing) are entered into the display device 32. When this operation has been completed, an additional thirty timed intervals are generated during which a range (or three-speed) computation occurs. At the conclusion of the second group of thirty timed intervals, another five-millisecond interval follows in which the three-speed computation is entered into the display device.

The sampling oscillator 18 drives a gate 40 (see FIGURE 1). The gate produces an output only if the computation is not to be "frozen," as will more fully appear hereinafter. As long as a voltage of five volts from the freeze control 16 is present, the gate 40 will be operative. When the freeze control 16 is energized, the voltage (the gate 40 enabling signal) is removed, and a disabling signal makes the gate 40 inoperative, preventing any of the sampling oscillator signals from initiating a program. The output of gate 40 passes to AND gate 41, which will be operative when all of its inputs are operative. One input of gate 41 will be operative when the two-cycle-per-second oscillator 18 and the freeze control 16 are operative. The other input to gate 41 comes from a sequence of logical events. This sequence originates in bistable element 42. Assume that bistable element 42 is inoperative. This is indicated by the presence of a signal at 2–S of bistable element 42. This signal causese gate 43 to be operative (this element being an OR gate and being made operative by either or both of its inputs). The inverter element 44 causes the signal at its output to appear inoperative. Inverter element 45 causes the signal to again be operative (at its output). This operative signal causes delay element 46 to produce an operative signal after a delay (in this case, two microseconds). The element 46 will cause the other input of gate 41 to be operative, thus making bistable element 47 operative. If all the inputs of gate 48 are inoperative, gate 48 will, of course, be inoperative. One input comes from bistable element 47. If 47 is previously made operative, one of its outputs will be operative and the other will be inoperative. The output which is now operative is one of the inputs to the gate 48. The other inputs to gate 48 come from a sequence of logical events. Since bistable element 42 is inoperative, gate 49 will invert the proper output of bistable element 42, causing an inoperative input to appear at gate 48 (input 49'). Input 50 employs a two-speed (bearing) reference signal at its source. Buffer element 51 provides electrical isolation of this signal. Element 52 senses the reference signal (a sinusoidal signal, the frequency of which is that of the carrier of the synchro), the variations of which are in synchronism with the variations of the stator voltages. As the reference signal nears its peak, element 52 produces an operative signal. Inverter element 53 causes this signal to be inoperative, thus making input 50 of gate 48 inoperative. It is important that the computations of ratios are occurring at a point when the synchro voltages are at their maximum excursion. This factor allows the system to deal with voltages which are the largest possible ones with which to compute a ratio.

Input 50 of gate 48 will maintain gate 48 operative until the reference is near peak voltage. When this occurs, gate 48 will become inoperative, as mentioned hereinabove, so that the program will not commence until the signals are near their peak excursion. Inverter element 54 causes an inoperative signal at 54 to be operative. This causes bistable element 55 to be operative. Gate 56 is thus operative (since one of its inputs is now operative). Inverter element 57 is inoperative. Gate 58 is operative as long as either or both of its inputs are operative. Since input 59 is inoperative, input 60 will determine when gate 58 is operative and when it is inoperative. Input 60 is connected with a 100,000-cycle-per-second oscillator 61. The oscillator 61 causes alternate operation and inoperation of bistable element 62. The frequency of operation and inoperation of gate 58 is therefore 50,000 cycles per second. The output of inverter 63 alternates at this rate. Thus, the clock 17 controls the time at which logical decisions are made throughout the device, in conjunction with the additional control afforded by the program pulse generator 19. To assure that the thirty time intervals include only one clock interval, the program pulse generator is not advanced until two millionths of a second after a clock has passed.

The above operation is performed by inverter 64, delay element 65, and inverter 66. The output of inverter 66 (50,000 cycles per second) passes to the program pulse generator. When the program pulse generator has counted the first thirty time intervals, a signal will come from the same, signifying that this is so. This signal is indicated as P30 in FIGURE 1 in the drawings.

Upon the occurrence of signal P30, bistable element 42 will change its state. If it was previously inoperative, it will now cause the bistable element to be operative. This change of state puts an enabling signal on the output 3S, and a disabling signal on output 2S. Previously, the output 2S enabled the device to perform the two-speed computation. Upon being disabled, the device is prepared to commence three-speed computation. As has been previously mentioned, both two-speed and three-speed computations employ the same thirty program steps.

Simultaneously with the preparation for three-speed computation, the signal P30 causes delay element 65, through inverter element 66, to be operative. An output of element 65 causes gates 43 and 67 to be inoperative. Since the other outputs to gates 43 and 67 are connected to bistable element 42, only gate 43 is inoperative, and inverter 44 causes gate 68 to be operative. This allows inverter 69 to generate a control signal to allow the contents of the registers (the solution to the computation) to pass to the two-speed display. When delay element 65 has ended its five-millisecond interval, gates 43 and 67 are returned to an operative condition, causing inverter 44 to return to an inoperative state. This disables gate 68, returning the output of inverter 69 to a condition which prevents the contents of the registers from being further entered into the readout. In addition to signal P30 complementing bistable element 42, and initiating delay element 65, element 46 will enable gate 70 which has signal P30 and clock 17 as its inputs, and will therefore be operative at a simultaneous occurrence of signal P30 and the clock which occurs during the interval of the signal P30. Gate 70 causes bistable element 47 to return to the inoperative state. This operation must take place to allow the clock to the program generator to cease while the information is passing to the display and then commence in accordance with the three-speed reference signal.

Considering how the clock ceases, bistable element 42 was made operative upon the occurrence of signal of P30. Thus, at the time that the delay of element 46 began, the output of inverter 71 was inoperative. This caused bistable element 55 to become inoperative. Bistable element 55 output to gate 56 is therefore inoperative. Gate 56 will not be operative unless its other output is also inoperative. The other output is connected to bistable element 72. Element 72 was made inoperative upon the occurrence of signal P30 through the bistable element 42 and inverter 49. Gate 56 is now inoperative. Inverter 57 is operative (or enabled), and gate 58 is now operative because of input 59, irrespective of the input 60 signal. However, input 60 is the clock input, and thus the clock can no longer control gate 58 until input 59 is returned to the inoperative state. This operation effeitively shuts off the clock. When the delay on 60, which began at the same instant as the above-described sequence of events, is over, the clock will commence again, but only near the peak of the three-speed (range) reference.

When the delay on 65 ends, gate 43 will return to an operative condition. Inverter 44 is thus inoperative and inverter 45 is operative. This initiates delay 46. Delay 46, in turn, enables gate 41. The other input to gate 41 is still enabled by the oscillator 18, which initiated the above sequence.

The above operation will be better appreciated from a consideration of the relative time intervals involved. Oscillator 18 is a two-cycle-per-second oscillator, and thus remains in one condition for 250 hundredths of a second. The first thirty steps of the program have consumed 20 millionths of a second per step, or 600 millionths of a second. The largest lapse in time between the initiation of the level assumed by oscillator 18 and the actual commencement of the program under control of the two-speed reference is 2.5 hundredths of a second. Thus, the greatest elapsed time is a total of 2.5 plus 0.6, or 3.1 hundredths of a second. Since oscillator 18 assumes the initiating condition for 250 hundredths of a second, it still is in the initial state at the instant that the gate 41 is enabled by delay 46. Bistable element 47 is again operative, causing the output 72 to be disabled. Output 72' is one of the inputs to gate 73. The remaining inputs to gate 73 come from a series of logical events. The output 74 of bistable element 42 is enabled. The output of inverter 71 is thus disabled. The output of inverter 71 is the second input to gate 73. The final input gate 73 initiates upon the three-speed reference signal. This signal is isolated by buffer element 75. The peak of this signal is detected by element 75, which is enabled near the peak. Inverter 76 is disabled and thus gate 73 becomes totally disabled near the peak of the three-speed reference. Inverter 77 is enabled, causing bistable element 72 to be made operative. This causes gate 56 to be operative, which disables inverter 57. Gate 58 once again returns to the control of the 50,000-cycle-per-second clock sequence. Elements 63, 64, 65 and 66 operate as before. When the program pulse generator has completed another thirty pulses, it will indicate this by the P30 signal appearing at the sampling control portion of the source. This signal changes the state of bistable element 42, returning it to an inoperative condition, and initiating delay 65 as before. However, now gate 67 will be made inoperative by delay 65 (as previously gate 43). Inverters 78 and 79 will cause a readout signal at readout driver control 3S, which will now cause the information stored in the coarse and fine registers to pass only to the three-speed display. Bistable element 47 is returned to an inoperative condition, and nothing further occurs until oscillator 18 initiates another program.

Reference is made to Table I. This table indicates the pulse interval and the corresponding transference of data or computation and its relation to the two- or three-spaced programs.

TABLE I.—THE PROGRAM

| Step or Program Interval Number | Two-Speed | Three-Speed |
|---|---|---|
| 1 | a. Force coarse register bistable elements to the inoperative (disabled) state.<br>b. Determine the sector and store this information (of the coarse speed). | a. Force coarse register bistable elements to the inoperative (disabled) state.<br>b. Determine the sector and store this information (of the coarse speed).<br>c. Determine whether medium speed is greater or less than 72,000 yards (that is, determine whether coarse speed has gone through more than one revolution). |
| 2 | a. No processing or computation. | a. Select 11,000 yard attenuation (on ratio decoder—largest tap possible in a sector). |
| 3 | a. Select largest tap in coarse sector. | a. If comparison of selected tap and input shows tap to have had a greater potential, disable the bistable element which selected that tap (enabled in step 2a).<br>b. Select tap which is equivalent to 6000 yards if 3a is true. |
| 4 | a. If comparator indicates tap potential is larger than input, reset the bistable element (make inoperative) which selected that tap.<br>b. Select next appropriate tap (based on 4a). | a. Reset (disable) tap if answer shows tap potential is greater than input.<br>b. Select next appropriate tap. |
| 5 | Similar operation as in 4. | Similar operation as in 4. |
| 6 | Similar operation as in 5. | Similar operation as in 5. |
| 7 | Similar operarion as in 6. | Similar operation as in 6. |
| 8 | a. Add least significant bit of medium register to number from fixed number generator. | a. No processing or computation. |
| 9 | a. Add next least significant bit of medium register to number from fixed number generator. | a. Add number of medium register to number from fixed number generator. |
| 10 | a. Add next least significant bit (digit) of medium register to number in fixed number generator.<br>b. Determine sector of fine synchro. | a. Similar to above.<br>b. Determine sector of fine synchro. |
| 11 | a. Similar to above.<br>b. Force fine register to inoperative state. | a. Similar to above.<br>b. Force fine register to inoperative state. |
| 12 | a. Adjust medium register which now stores the sum so that no digit greater than 10 exists. | a. Adjust medium register which now stores the sum so that no digit greater than 10 exists.<br>b. Set most significant appropriate tap on ratio decoder. |
| 13 | a. Set most significant appropriate tap on ratio decoder (fine register).<br>b. Continue adding number from medium register to number produced by fixed number generator. | a. If comparator indicates that selected tap has a voltage greater than the input, reset that tap and select smaller (lower potential) tap.<br>b. Set next higher appropriate tap if selected tap has a potential smaller than the input.<br>c. Continue adding number from medium register to number produced by fixed number generator. |
| 14 | a. Select appropriate tap on ratio decoder by appropriately adjusting (enabling or disabling) fine register bistable elements.<br>b. Continue to add number from medium register to number produced by fixed number generator. | a. Select appropriate tap (of ratio decoder) similar to 13a and 13b.<br>b. Add medium register to number produced by fixed number generator. |
| 15 | Similar to 14. | Similar to 14. |
| 16 | Similar to 15. | Similar to 15. |
| 17 | a. Adjust medium register so that no number greater than 10 exists.<br>b. Continue selecting taps as above. | a. Adjust medium register so that no number greater than 10 exists.<br>b. Continue selecting taps as above. |
| 18 | a. Complete tap selection.<br>b. Add number in medium register to number in fixed number generator. | a. Complete tap selection.<br>b. Add number in medium register to number in fixed number generator. |
| 19 | a. Add number in fine register to number in<br>b. If ambiguity check indicates that one must be added or subtracted from medium register, add or subtract one to medium register. | a. Add number in fine register to number in fixed number generator.<br>b. If ambiguity check indicates that one must be added or subtracted from medium register, add or subtract one to medium register. |
| 20 | Continue as in 19a. | Continue as in 19a. |
| 21 | Continue as in 20a. | Continue as in 20a. |
| 22 | Continue as in 21a. | Continue as in 21a. |
| 23 | a. Adjust fine register so that no number greater than 10 exists. | a. Adjust fine register so that no number greater than 10 exists. |
| 24 | a. Add number in fine register to number in fixed number generator. | a. Add number in fine register to number in fixed number generator. |
| 25 | Continue as in 24. | Continue as in 24. |
| 26 | Continue as in 25. | Continue as in 25. |

TABLE I—Continued

| Step or Program Interval Number | Two-Speed | Three-Speed |
|---|---|---|
| 27 | Continue as in 26 | Continue as in 26. |
| 28 | a. Adjust fine register so that no number greater than 10 exists. | a. Adjust fine register so that no number greater than 10 exists. |
| 29 | a. Add number in fine register to number in fixed number generator. | a. Add number in fine register to number in fixed number generator. |
| 30 | a. Set 5-millisecond time delay to update readout. | a. If greater than 100,000 yards is detected, force all registers to inoperative (disabled) state.<br>b. Set 5-millisecond time delay to update readout. |

Figure 2A:
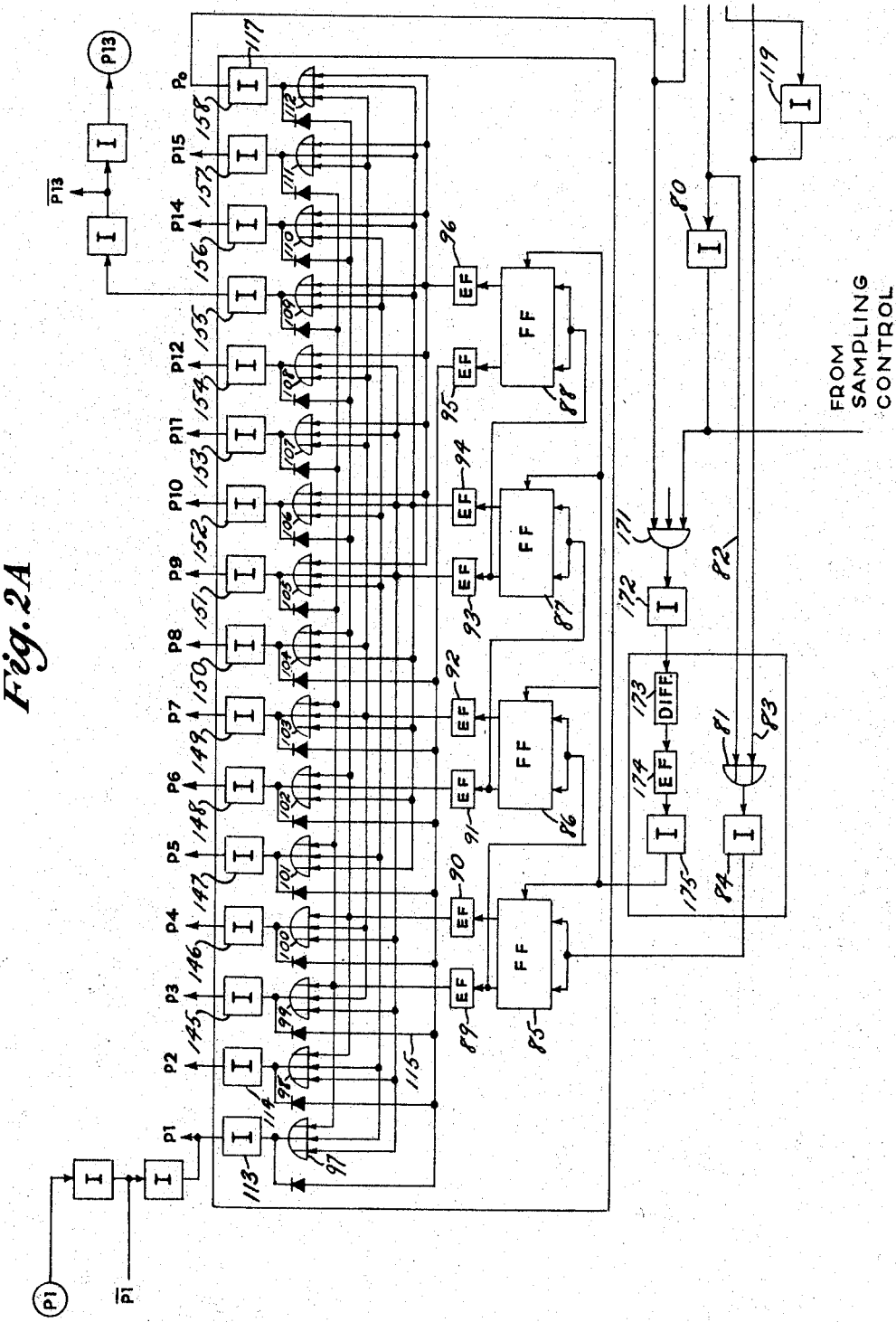
FIGURES 2A and 2B are an electrical schematic wiring diagram of a program pulse generator.

Reference is now made to the program pulse generator (see FIGURES 2A and 2B), which has as its input signals from the sampling control, and has as its outputs thirty lines on which the thirty sequential time signals occur, each line being enabled or made operative once during the time interval.

Program clock pulses from the sampling control enter one at a time under the control of the sampling control. These pulses are inverted in inverter 80, and are two millionths of a second in duration. The pulses enter gate 81 through input 82. Assume input 83 is inoperative. Gate 81 will then be made operative and inoperative in conjunction with element 66. Inverter 84 inverts the output of gate 81. The output of inverter 84 is thus a series of pulses at a 50,000-cycle-per-second rate, and two millionths of a second in duration. The pulses drive bistable element 85. The state of element 85 changes at each pulse regardless of the previous condition of 85. Thus, bistable element 86 is given from bistable element 85. Element 86 will change state only when bistable element 85 goes from an operative to an inoperative condition. This operation is also similar for bistable elements 87 and 88. Indicated in Table II is a summary of the sequential conditions of elements 85, 86, 87 and 88. In this table, an operative condition is indicated by 1, and an inoperative condition by 0. The table assumes that all elements started in inoperative, or 0, condition.

TABLE II

| Pulse Number (Output of Inverter 84) | State of Bistable Elements | | | |
|---|---|---|---|---|
| | 85 | 86 | 87 | 88 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |
| 16 | 0 | 0 | 0 | 0 |

It will be observed that after the sixteenth count, the states of elements 85, 86, 87 and 88 return to the assumed starting point (all inoperative). Thus, there are sixteen unique arrangements of these elements. Each output of each bistable element drives an electrical isolation element. These elements are 89, 90, 91, 92, 93, 94, 95 and 96.

Figure 2B:
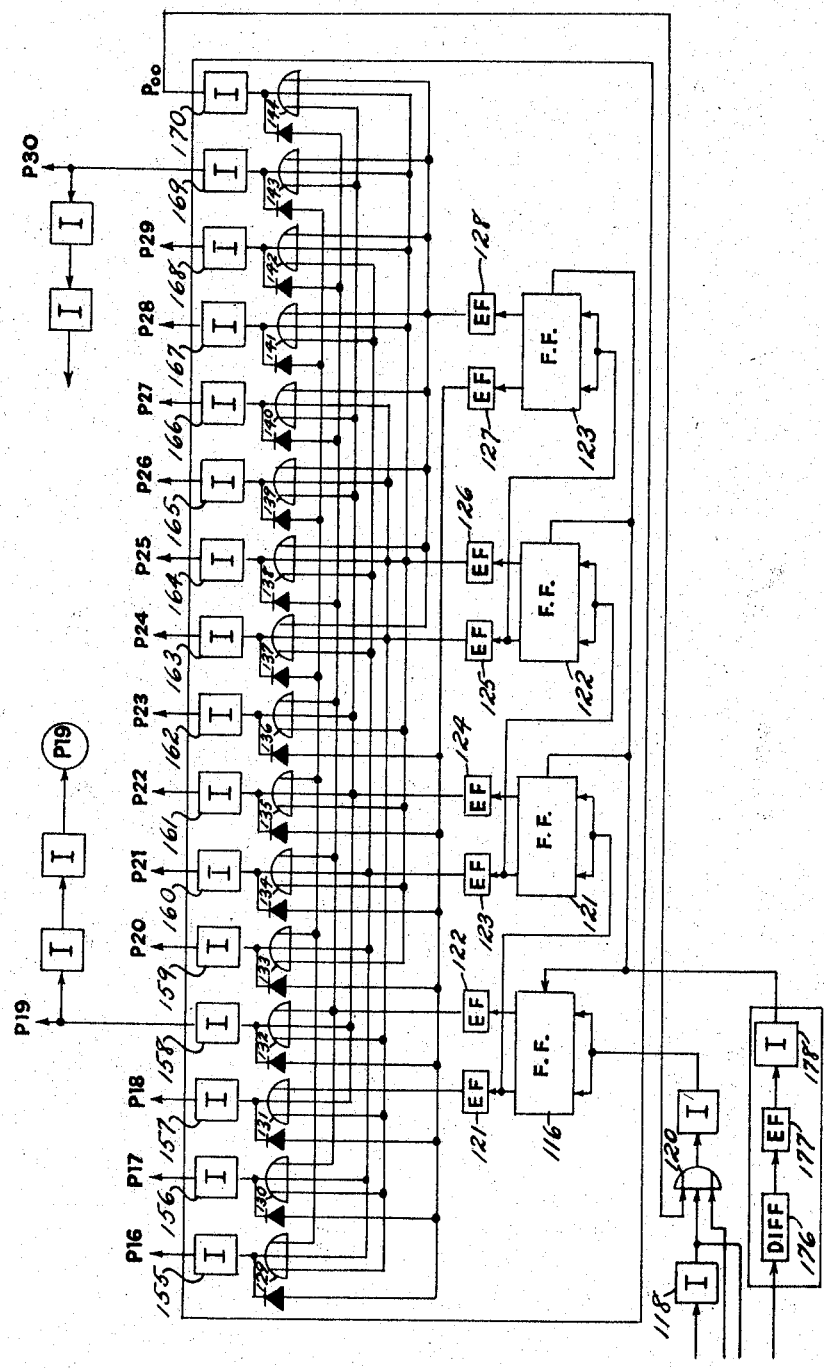

Upon consideration of the condition of these elements when all of the bistable elements are in initial inoperative state, the outputs of the isolation elements are connected appropriately to gates 97, 98, 99, 100, 101, 102, 103, 104, 105, 106, 107, 108, 109, 110, 111 and 112. Only gate 97 is inoperative. All of the other gates have at least one input from a buffered bistable element which is enabling, thus enabling all gates except 97. As each gate is followed by an inverter, only inverter 113 has an operative signal, and all of the other inverters have inoperative signals. The operative signal from inverter 113 is indicated in the drawing at P1. The bistable elements are changed in accordance with Table II. Thus, after the first pulse, the bistable elements have, as their respective states, 1, 0, 0, 0, for 85, 86, 87, and 88, respectively. For this condition, inverter 114 is the only gate which has all disabling signals. Inverter 113, for example, is made operative by line 115, and inverter 114 has all inoperative inputs. Thus, the output of inverter 114 is operative, and all other inverter outputs are inoperative. This output is indicated by reference character P2. At each successive change of condition of bistable elements 85, 86, 87, and 88, one, and only one, of the lines marked P1, P2, P3, P4, P5, P6, P7, P8, P9, P10, P11, P12, P13, P14, P15, and $P_0$ will be enabled, and these conditions will occur sequentially in similar fashion. These occurrences will produce sixteen conditions, as already stated. The sixteenth condition, $P_0$, is used to indicate that the first fifteen states have occurred. The $P_0$ line will prevent any further pulses from passing to bistable element 85, and will permit pulses to pass to bistable element 116 (FIGURE 2B). When $P_0$ (output of inverter 117) becomes operative, it passes to inverter 118, which makes the signal inoperative. This causes inverter 119 to be operative. Since input 83 to gate 81 is now operative, the output will be operative irrespective of the condition at input 82. The output of inverter 84 will be inoperative, and the bistable elements cannot further change state. However, the output of inverter 118 is inoperative, and this causes one output of gate 120 to be inoperative. The other inputs come from a sequence of logical combinations. Line $P_{00}$ will be inoperative if bistable elements 116, 121, 122, and 123 are inoperative. The considerations for this condition are similar to the conditions made for the gates 97 through 112, inclusive. Since two of the three inputs to gate 120 are inoperative, only the third input controls the state of this gate. The third input is connected to the sampling control via the inverter 80, and thus, after the first sixteen pulses, the program clock pulses now pass to bistable element 116 and no longer to bistable element 85. Isolation elements 121 through 128, inclusive, perform the analogous purpose as elements 89 through 96, inclusive. Gates 129 through 144 operate in a manner analogous to 97 through 112. The inverters 155 through 170, inclusive, operate similarly to the inverters 113, 114, and 145 through 158, inclusive. This arrangement produces an additional sixteen pulses (or time intervals) P16 through $P_{00}$. When the state P30 is reached, gate 171 becomes enabled at the next program clock, since $P_0$ was operative as explained hereinabove. Reaching this condition causes a transition through elements 172, 173, 174 and 175, which, in turn, returns all bistable elements to the inoperative state, the assumed initial condition. The operative state $P_{00}$ causes gate 120 to be operative, preventing a pulse from reaching bistable element 116. When the first counting reaches condition $P_{00}$, the elements 176, 177 and 178 cause bistable elements 116, 121, 122 and 123 to return to the inoperative state. The lines P1 through P30, inclusive, will appear at various points in the device. These are the control lines for directing information and performing computations.

The inputs from the remote transmitter synchros drive a set of locked shaft differential synchros, as illustrated in FIGURE 3 in the drawings.

The outputs of the differential synchros 179, 180, 181, 182 and 183 pass to sets of attenuators, each having a similar set of resistors 184, 185, 186, 187, 188 and 189. The attenuators are included so that magnitudes of the synchro signals do not exceed the breakdown of the circuits within the remainder of the device. In addition, these resistors allow the signals on lines 190, 191 and 192, which represent electrical potentials between output lines of the differential generators, to have a common reference (ground). The signals on lines 190, 191 and 192 for each synchro thus represent an electrical signal which varies with respect to ground.

Figure 4:
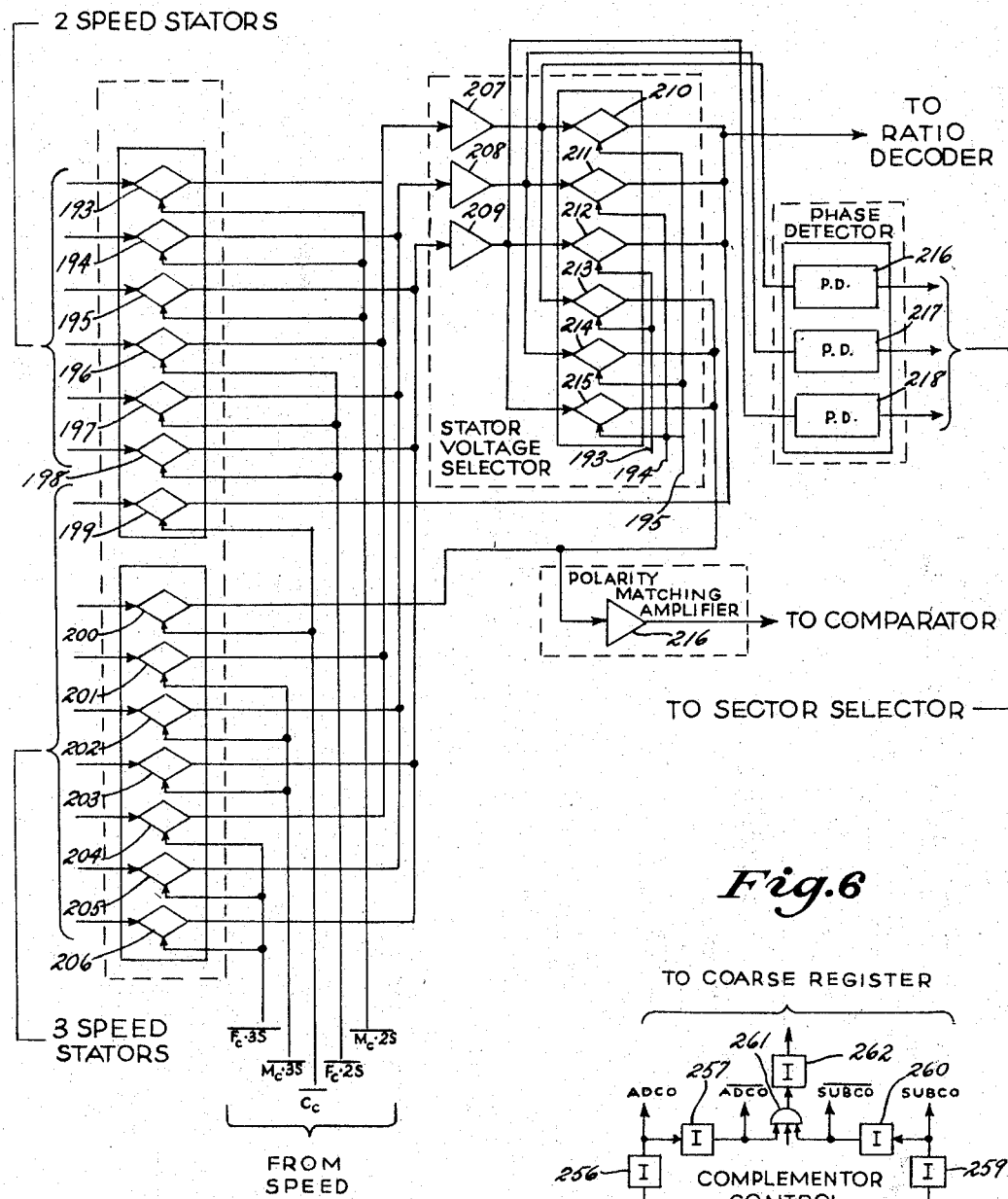
FIGURE 4 is a schematic wiring diagram of the synchro selector, phase detector, ratio selector, and polarity matching amplifier.

Referring to FIGURE 4, a typical arrangement for selecting the proper synchro and its proper stator for determining the ratio is illustrated. The gates 193 through 206, inclusive, are conditioned upon receipt of signals $F_c.3S$, $M_c.3S$, $C_c$, $F_c.2S$, or $M_c.2S$. The appropriate signal conditions the corresponding gate or gates. The signals are obtained from the two/three-speed coarse, medium, fine controls 20, which condition the gates at a time controlled by the program pulse generator. These gates are of the type known as field effect gates (employing field effect transistors) as described in the co-pending application of Seymour Schlussel et al., Ser. No. 307,454, filed Sept. 9, 1963, and assigned to the same assignee as the instant application. The gates 193 through 206, inclusive, transmit any signal at its input to the respective output terminal upon being conditioned. Owing to the characteristics of the gate employed, the signal will not be distorted. Since the stators are conditioned one set at a time, there is no interaction between stators of different synchros. Amplifiers 207, 208 and 209 are included to electrically isolate the selected set of stator voltages from the remainder of the competing elements. Gates 210 through 215, inclusive, are conditioned by the sector selector. They allow the appropriate line to pass to the ratio decoder 23 (E larger), and to pass to the polarity matching amplifier 216, and thence to the comparator (E smaller) 34.

The particular stator 190, 191 or 192, which passes to these lines, is selected in accordance with Table III hereinbelow.

TABLE III

| Sector as Determined by Sector Selector | E Larger (To Ratio Decoder) | E Smaller (To Comparator) |
|---|---|---|
| 1 | S3 | S1 |
| 2 | S1 | S2 |
| 3 | S2 | S3 |
| 4 | S3 | S1 |
| 5 | S1 | S2 |
| 6 | S2 | S3 |

The E larger signal passes to the ratio decoder (attenuator) 23 which, when attenuated by an amount selected by the proper register, will be compared against E smaller. The amount of attenuation changes in a preprogrammed manner. When the process is complete, an amount of attenuation has been selected which makes the attenuated E larger signal equal to the E smaller signal.

The control lines 193, 194 and 195 from the sector selector determine which of the gates 210 through 215 shall be conditioned. Only two lines are conditioned at a time, again as indicated in accordance with Table III.

Phase detectors 216, 217 and 218 are driven by the set of synchro stator leads selected by the synchro selector 10. This provides an output which is at one of two levels. The levels depend upon the relative phase of the selected stator leads, and the reference signal. Since the computation occurs at a positive excursion of the reference signal, if the output of the phase detector is at one level, then that stator is in phase or synchronism with the reference. If the output of the phase detector is at the other level, then that stator is out of phase or synchronism with the reference. A unique phase relationship exists in every sector, and the sector selector uses this unique relationship to determine the sector of the selected synchro.

Figure 5A:
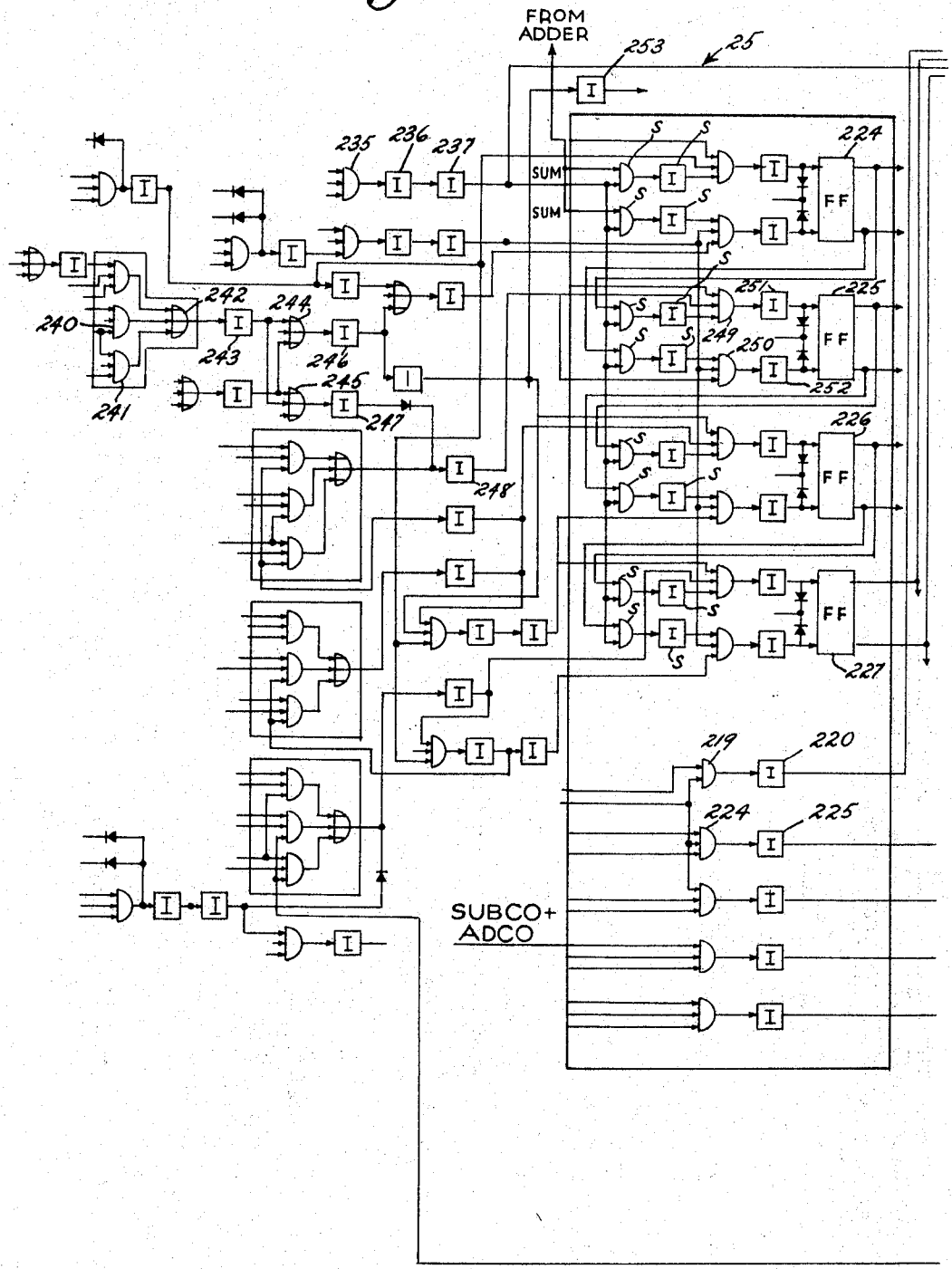
FIGURES 5A and 5B are a schematic wiring diagram showing the coarse register and complementor.
Figure 5B:
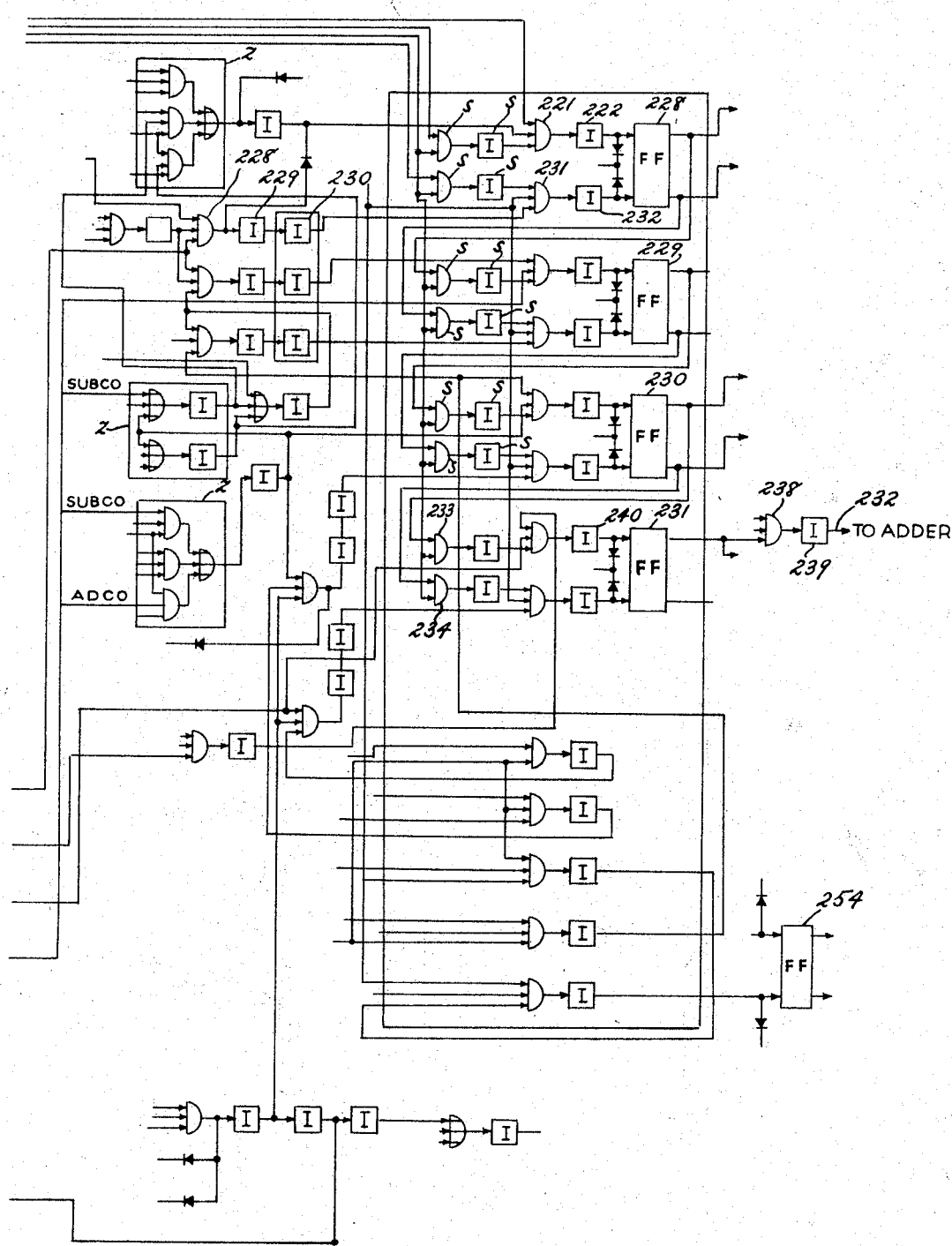

Referring to FIGURES 5A and 5B, the coarse register 25 is illustrated. This figure indicates the typical logical arrangement required to control the registers during the computation process. It includes the bistable elements of the registers (the final storage medium). These elements store the digital equivalent of the analogue position of the synchro shaft (after determination of the intrasector angle) and, after addition and suitable correction to the sector number representing the engineering equivalent of the sector, the total digital equivalent of the analogue position of the shaft.

Considering a typical sequence of operation, gate 219 produces an output when both of its inputs are operative. This occurs at program step 2, and when the device is in its three-speed computation, inverter 270 disables this signal. This operation disables gate 221 (FIGURE 5B), and inverter 222 enables the signal. Thus, bistable element 228 is enabled (at program step 2 of the three-speed computation). Bistable element 228 drives the two/three-speed ratio decoder 24. If a signal is received from the comparator 34, that tap (or attenuation) selected by bistable element 228 has a potential greater than the stator voltage against which a ratio is being determined; then gate 224 will be made operative at program pulse 3. This occurs because the inputs to gate 224 are $\overline{E}$ (the signal that the selected tap voltage is greater than the E smaller stator voltage), program step 3 (P3), and the signal that this is occurring during the three-speed computation (3S). Inverter 225 disables this signal, which in turn disables gate 228. The chain inverters 229 and 230, gate 231, and inverter 232 generate a signal at the input of bistable element 228 which disables said element. If $\overline{E}$, however, is not present, then element 228 is not reset, and this condition stores the digital equivalent of the fact that the remote shaft has at least that much rotation (within the sector) as is represented by the tap selected by bistable element 228. If bistable 228 remains set, this indicates that, in the case of three-speed synchro information, the coarse shaft has at least a rotation equivalent to an electrical angle N degrees (where N degrees is the equivalent of 8,000 yards). Table IV indicates the value associated with each bistable element of the coarse register.

TABLE IV

| Bistable Element | Value in Three-Speed Yards | Value in Two-Speed Degrees | Degrees of Rotation Within a Sector | |
|---|---|---|---|---|
| | | | 3-Speed | 2-Speed |
| 224 | 80,000 | 800 | -------- | -------- |
| 225 | 40,000 | 400 | -------- | -------- |
| 226 | 20,000 | 200 | -------- | -------- |
| 227 | 10,000 | 100 | -------- | -------- |
| 228 | 8,000 | 80 | 40 | -------- |
| 229 | 4,000 | 40 | 20 | 40 |
| 230 | 2,000 | 20 | 10 | 20 |
| 231 | 1,000 | 10 | 5 | 10 |

Bistable elements 224, 225, 226 and 227 can only be made operative as a result of adding a sector number to the intrasector angle. In the case of two-speed rotation, the bistable elements 224 and 225 cannot be made operative since the total representative rotation can only be 359.9 degrees, and this can be represented by a computation of 226 through 231. Since there is only a distance of 12,000 yards represented on a three-speed sector, and 60 degrees in a two-speed sector, the column marked "Degrees of Rotation Within a Sector" has been appropriately completed.

It will be observed that 20 degrees of mechanical (and hence electrical) rotation represents either 20 degrees of the two-speed or 4,000 yards of the three-speed transmission. Thus, only one tap (a 20-degree tap) is needed to determine both of these differing engineering units. Any system of units may be thus represented. When any required display increment of that new system does not have the electrical displacement (in degrees) of any of the other systems being encoded by the device, an additional tap, of course, must be provided.

The bistable elements 228, 229, 230 and 231 retain the digital equivalent of the amount of electrical rotation within a sector (of either the two- or three-speed transmitting synchros). This register feeds the information to the adder 31, which adds an amount (in yards or degrees) to this increment, dependent upon the sector in which the remote transmitter is positioned.

The process of transmitting the data to the adder upon command uses the well-known digital technique of shifting the information from one bistable element to another; that is to say, from a more significant bistable element to a less significant bistable element. The least significant coarse register bistable element 231 transmits its own data (together with all more significant data) to the adder, this data being indicated by reference character 232 in FIGURE 5.

The shifting process may be understood by considering the following. Assume bistable element 230 is operative. Its enabling output passes to gate 233, and disabling output passes to gate 234. The other inputs to these gates come from a chain of logical events. These are gate 235 (FIGURE 5A) and inverters 236 and 237. Gate 235 is enabled by $STP_m$, a signal on conductor 236, and the clock 17. The clock signal is as described hereinabove, and the signal on 235 is a time signal derived from the stepper control 21. The stepping signal $STP_m$ is enabled during the entire adding cycle, as indicated in Table I. The common inputs to gates 232 and 234 will be energized during the addition computation. Since element 230 is operative, only gate 233 will be operative. Inverter 238 makes the signal inoperative. This causes gate 239 to become operative. Inverter 240 makes bistable element 231 operative. This will occur at a system clock time through the other input to gate 235. Thus, bistable element 231, at the conclusion of this process, will store an operative state. This is the state of element 230, and consequently the state of 230 has effectively been transferred to 231. At each successive clock interval, element 230 will transmit its information to 231. Element 224 transmits to element 225, and this continues until all members have been transferred through element 231 to the adder 31 by way of gates 238 and inverter 239.

The output of the adder 31 is returned to the coarse register 25. Signals SUM and $\overline{\text{SUM}}$ represent the sum of the register and fixed number generator 22. As the former number is shifted out of 224, the sum is entered into 224. The sum will continue to be shifted into the register, and when the addition is complete, the sum will be stored in the same. Gates and inverters indicated by S in the drawing are employed in the shifting process, in addition to those specific gates previously mentioned.

Another function performed at this time is the process of correcting the registers so that no number greater than 10 can be stored therein. The numeric system employed in the device is a binary coded decimal system. This system, because the decades thereof are decimal (each group of four register bistable elements representing a decimal increment), can represent digital functions directly in engineering units with each decade capable of representing one decade of transmitted (or encoded) information. When two binary numbers are added together, it is possible to arrive at a number greater than 10. Consider Table V.

TABLE V

| Decimal No. | Binary Representation of Sum | | | | Binary Coded Decimal Representation of Sum | | | | | | | |
|---|---|---|---|---|---|---|---|---|---|---|---|---|
| | A | B | C | D | A' | B' | C' | D' | A | B | C | D |
| 12 | 1 | 1 | 0 | 0 | 0 | 0 | 0 | 1 | 0 | 0 | 1 | 0 |

When the number 6 is added to the number 6, the sum is 12. This is a number greater than 10. The binary equivalent of 6 is 0 1 1 0. If this number stored in the register is added to a number 0 1 1 0 (6) from the fixed number generator, the sum from the adder will be 1 1 0 0. This may be stored in one decade of the coarse register. However, it is desired to represent 12 as a two-decimal (binary coded) number, the first number being the binary equivalent of a 1, and the second decade being the binary equivalent of a 2 (0 0 0 1 and 0 0 1 0, respectively). The register A B C D (Table V) must therefore be readjusted as follows. Force bistable elements A and B to be inoperative. Force bistable element C to be operative. Generate a signal to force bistable element D' to be operative. Table VI sumarizes this logical process.

TABLE VI

| Decimal No. | Binary Number | | | | Decimal Number (Binary Coded) | | | | | | | |
|---|---|---|---|---|---|---|---|---|---|---|---|
| | A | B | C | D | A' | B' | C' | D' | A | B | C | D |
| 10 | 1 | 0 | 1 | 0 | 0 | 0 | 0 | 1 | 0 | 0 | 0 | 0 |
| 11 | 1 | 0 | 1 | 1 | 0 | 0 | 0 | 1 | 0 | 0 | 0 | 1 |
| 12 | 1 | 1 | 0 | 0 | 0 | 0 | 0 | 1 | 0 | 0 | 1 | 0 |
| 13 | 1 | 1 | 0 | 1 | 0 | 0 | 0 | 1 | 0 | 0 | 1 | 1 |
| 14 | 1 | 1 | 1 | 0 | 0 | 0 | 0 | 1 | 0 | 1 | 0 | 0 |
| 15 | 1 | 1 | 1 | 1 | 0 | 0 | 0 | 1 | 0 | 1 | 0 | 1 |

The rules may be summarized for performing this adjustment. When a greater number than 10 is detected, complement (change the state of) bistable element C, force A to be inoperative, complement B when B is operative and C is inoperative. Finally, generate a carry (or add) to the next higher decade.

These logical decisions are made in gates 240, 241, 242, inverter 243, gates 244, 245, inverters 246, 247, and 248. Gates 249 and 250 and inverters 251 and 252 are the channels through which bistable element 235 is adjusted. Inverter 253 provides a carry signal to the adder which is added to the next higher decade.

Figure 23:
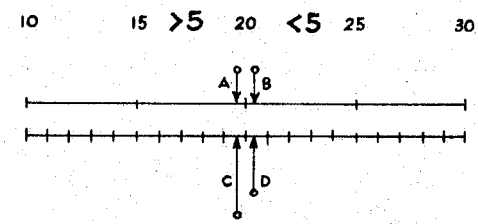
FIGURE 23 is a graphic representation of encoding error eliminated by the present invention.

The final major function performed by the register is the process of ambiguity adjustment. The problem of ambiguity and its solution involves the complementor control 28. This block consists of gates which make the logical decision to add or subtract for ambiguity adjustment on program command. The decision to add or subtract is one made by considering the coarse information and the fine sector information. Complementation (or ambiguity adjustment) is performed to prevent large errors which may occur in the encoding process. To understand how these errors come about, consider the following problem which exists in multispeed transmitting systems. In analogue servomechanisms, it is the fine synchro which actually determines the reading point. Thus, if the reading point is located near a transition, it is possible, using non-precise zeroing for the encoder, to make a gross error. Referring to FIGURE 23, there is drawn out on linear scales the representation of transmitted information. The arrows represent possible transmitted information. (For convenience, decimal information alone is considered, but it will be understood that the problem of error concerns all engineering units.) For the arrangement of transmitted information shown, four possibilities exist. The transmitters could transmit A and C, B and D, A and D, and B and C. If the transmitters transmit A and D, or B and C, then the device would encode 10 in the former case, or 29 in the latter case. In either case, the answer would be incorrect by about 10, since the transmitted signal was intended to be 20 within a given resolution. To avoid these errors (at each rotation of the fine synchro), the fine synchro actually determines when an integral transition is made (when it crosses zero). The coarse synchro is sampled to determine whether it is greater than a turn of the fine, or less than half a turn of the fine, synchro. This is determined (in the decimal case) by detecting whether the number is greater than 15 or less than 25 (since the encoder would encode 10 and greater for positions A, and 20 or less than 25 for positions B). As the fine reading line crosses from 9 to 0, the sector information obtained from the sector selector changes from sector 6 to sector 1. Thus, if it is determined that the fine information is in sector 1 (it has made the integral transition), and the coarse indicates a number greater than 5 (10, and greater than 15), then 10 must be added to the coarse register. This case corresponds to a transmitted condition of A D. If the coarse is less than 5 and the fine is in sector 6, then 10 must be subtracted from the coarse register. The following table summarizes these conditions.

| Transmitted Position | Intended Position | Non-Corrected Encoding | Fine Sector | Coarse (less or greater than 5) | Corrected Encoding |
|---|---|---|---|---|---|
| A and D | 20 | 10 | 1 | >5 | 20 |
| B and C | 20 | 29 | 6 | <5 | 19 |

The corrected answer is correct to within a certain accuracy.

If the coarse register bistable element 254 (FIGURE 5B) is operative (after determination of the intra-sector angle), and the sector selector indicates that the fine synchro is in sector 1, then a count must be added to the coarse register. The bistable element 254 stores the fact that the fine synchro has gone more than half of a revolution. This can be determined by determining whether the coarse synchro is greater or less than one-half of its own least increment.

If the coarse register bistable element 254 is inoperative (after determination of the intra-sector angle), and the sector selector indicates that the fine synchro is in sector 6, then a count must be subtracted from the coarse register. The bistable element 254 will be inoperative if the coarse synchro has not traversed half of its revolution. This can be detected by determining in what increment the coarse synchro is operating.

This operation can be performed independently of the unit of measurement of the remote transmitters, as only the electrical rotation of the synchros is of consequence. Thus, any two-speed or three-speed system with any engineering units may be treated in the above manner.

Figure 6:
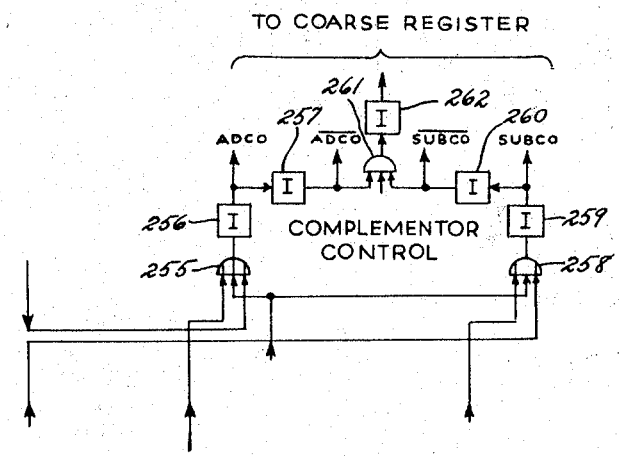
FIGURE 6 is a wiring diagram showing the complementor ambiguity control.

The logical conditions implied in the above two cases are implemented in the illustration of FIGURE 6. Gate 255 is made inoperative when bistable element 254 (on the coarse register) and sector 1 input are inoperative. This will cause gate 255 to be inoperative, and inverter 256 will then make the signal operative. During this condition, it is necessary to add one to the coarse register, this signal being indicated as A D C O. Inverter 257 generates the inverse of this signal, indicated as $\overline{A\ D\ C\ O}$. Gate 258 will generate a signal only when conditions are correct for subtracting 1 from the coarse register. This will be generated as an operative signal in inverter 259, and is identified as S U B C O. Inverter 260 generates the inverse of this signal, which is $\overline{S\ U\ B\ C\ O}$. Finally, gate 261 and inverter 262 combine to produce a signal whenever A D C O or S U B C O, or both, are enabled.

These signals pass to the coarse register (see FIGURE 5). The subelements indicated by reference character Z perform the function of adding or subtracting one to the coarse register. This is accomplished by a known technique of complementing (changing the state of) each bistable element in accordance with the state of a less significant bistable element and the A D C O or S U B C O signals.

Figure 7A:
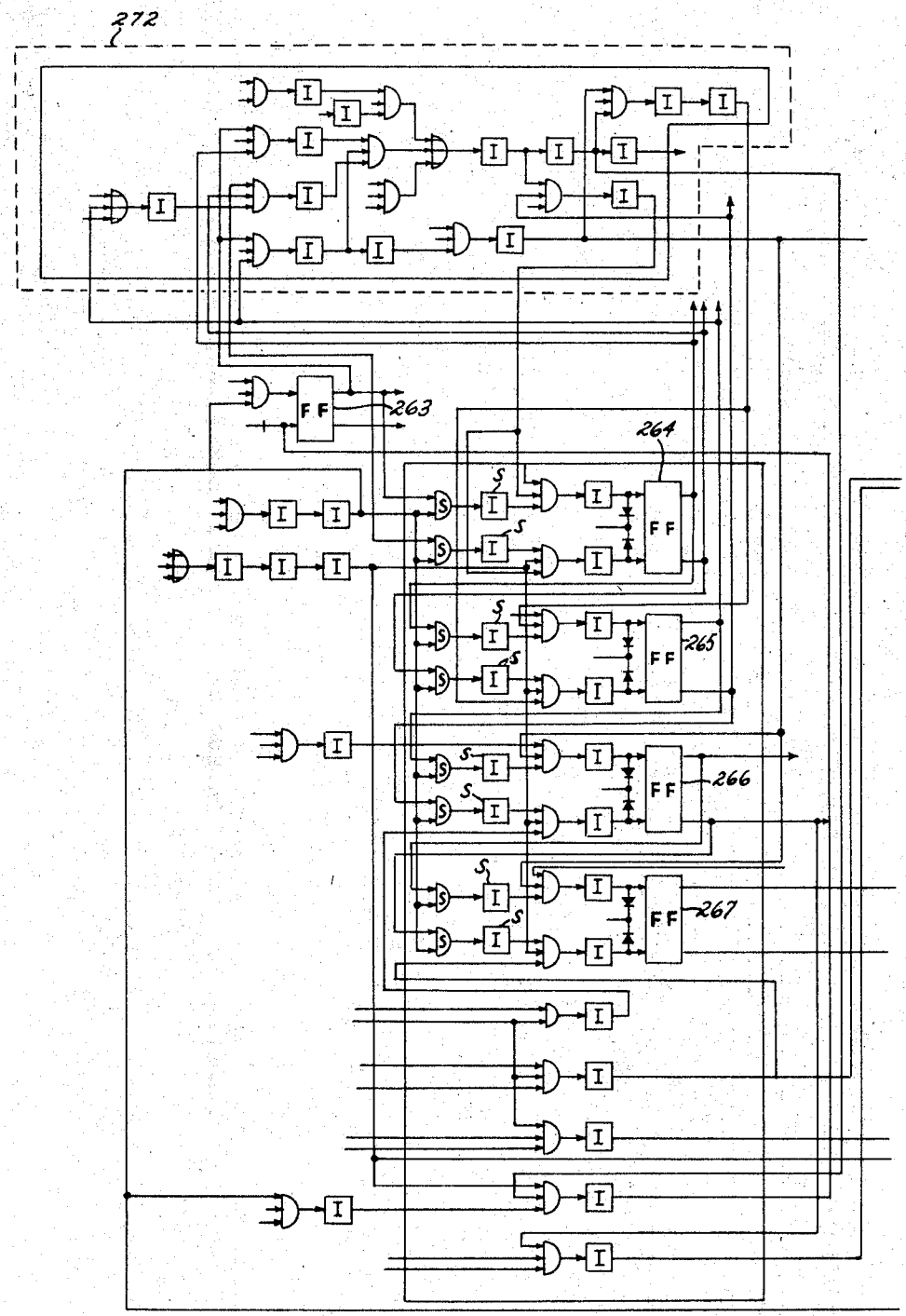

The fine register 29 is similar in function to the coarse register. It stores the result of the intra-sector angle determination, and the result of the addition of the intra-sector angle (expressed in engineering units), and the fixed number generator 22. The fine register contains the gating necessary to adjust the registers for numbers greater than 10, and provides a carry to be added to the next higher significant decade. Referring to FIGURES 7A and 7B, the fine register elements include bistable elements 263, 264, 265, 266, 267, 268, 269, 270 and 271, which contain the computations concerned with the fine synchro transmitter.

The gates and inverters marked S are concerned with the shifting of data as previously described during the process where the register contents are added to the fixed number generator and restored in the fine register. The gating elements shown at 272 provide the necessary controls for detecting numbers greater than 10 present in the register, and the signals necessary to force the register bistable elements to the appropriate state.

Figure 8:
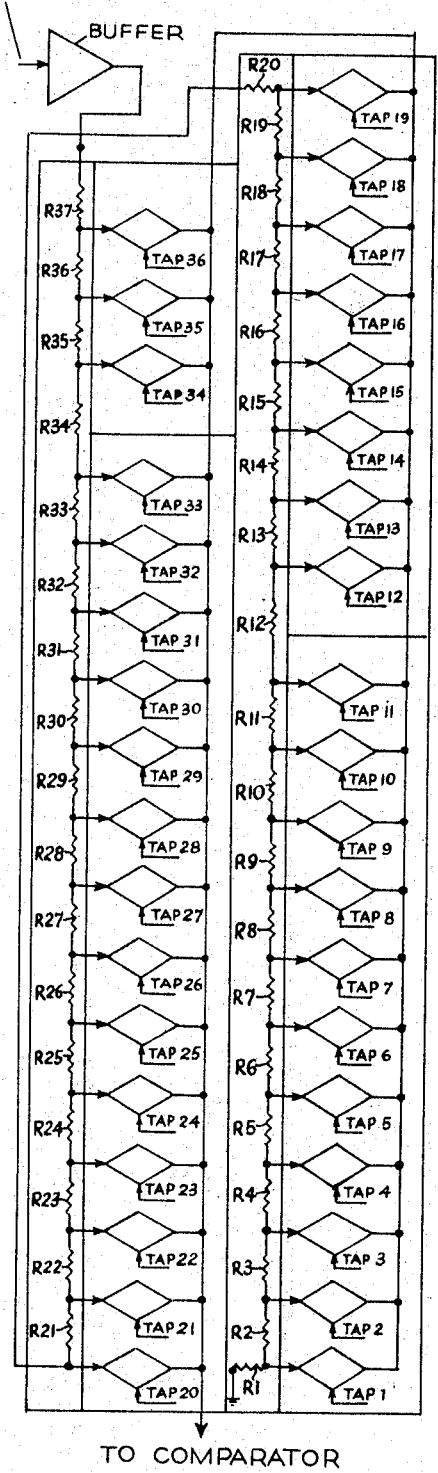
FIGURE 8 is a wiring diagram showing a ratio decoder including attenuator and analogue gates.
Figure 9:
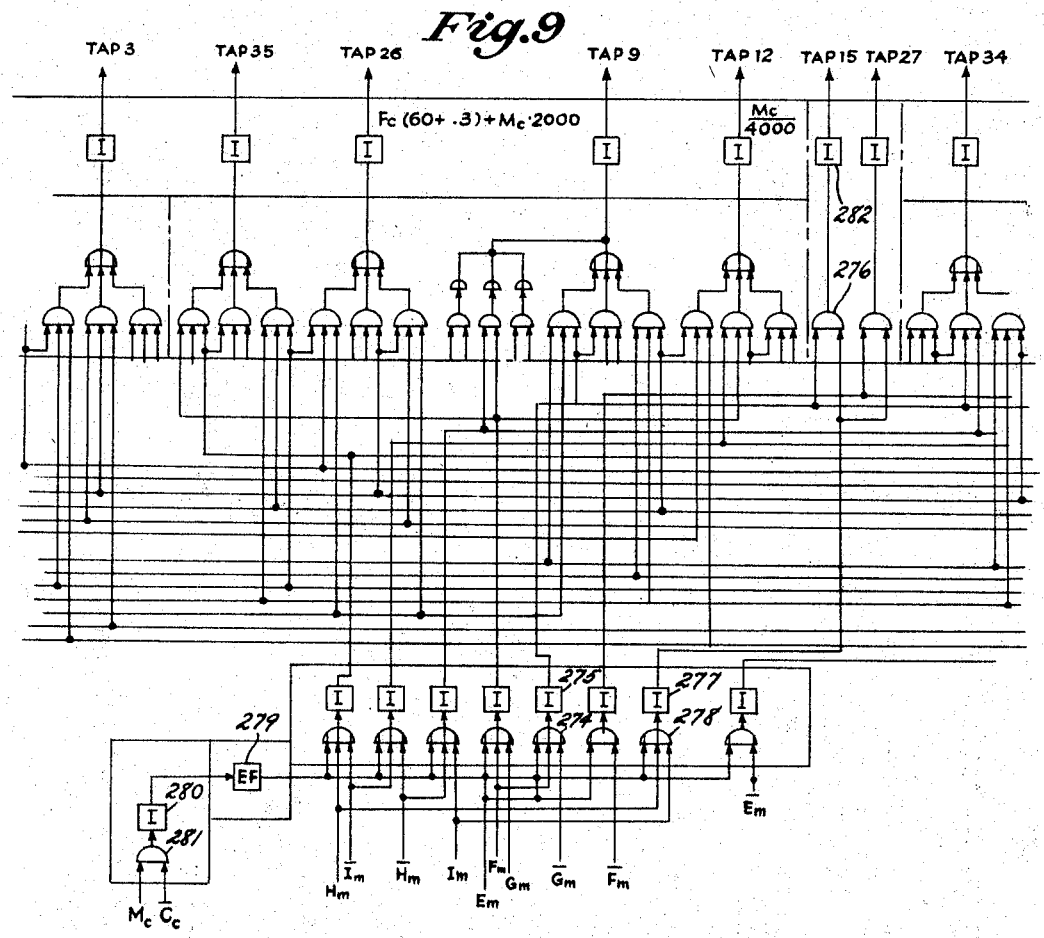
FIGURE 9 is a wiring diagram showing a control gating ratio decoder.

Referring to FIGURES 8 and 9, there is illustrated the two/three-speed, coarse-medium-fine ratio decoder 23. FIGURE 8 relates to the attenuator, the analogue gates which transmit a received signal at any attenuation point to the comparator 34, and an amplifier for electrically isolating the attenuator from the ratio selector 15. FIGURE 9 illustrates the gating necessary to select or control the selection of a given attenuation point. The inputs to the ratio decoder (attenuator) are connected to the coarse and fine register bistable elements, and the outputs of the same control the analogue gates shown in FIGURE 8.

Figure 10A:
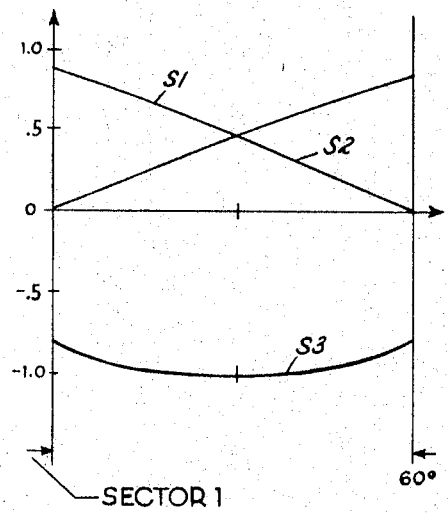
FIGURES 10A and 10B are graphic representations of certain stator relationships.
Figure 10B:
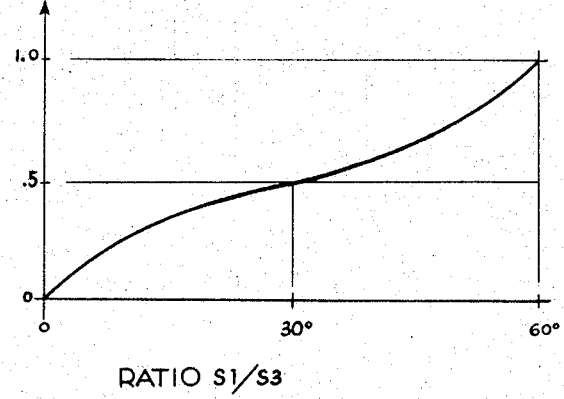

The ratio decoder (attenuator) consists of a series of accurate resistances which are so arranged as to divide the input signal to the attenuator in a precise manner. The amount of attenuation is based upon the mathematical relationship that always exists between the $E_{smaller}$ stator and $E_{larger}$ stator signals. Irrespective of the sector in which the transmitter is presently located, a unique mathematical relationship exists between the absolute values of the magnitudes of the stator that commences at zero volts (for that sector), and the stator that passes through its maximum value for that sector. This relationship is illustrated in FIGURES 10A and 10B.

For sector 1 (FIGURE 10A), stator S1 commences at zero magnitude, and stator S3 passes through a relative value of one for that sector. Thus, a ratio of S1 and S3 produces a curve shown in FIGURE 10B. If stator S3 were attenuated by the correct amount (in the aforementioned attenuator), then the attenuated output would only equal the S1 stator voltage at the correct electrical rotation of the transmitter.

The attenuation points are determined by including the following considerations:

(a) Equivalent electrical rotation (angle) of the transmitter for the increments to be displayed.

(b) Effects of system errors on the selected attenuation point.

With reference to the equivalent electrical rotation, assume it required to display the position of the shaft of a remote transmitter, and that this transmitter represents yards as transmitted engineering units. Assume further that the transmitter has a full revolution of value 2,000 yards.

Once the sector of the transmitter is determined, the value to the nearest 333.33 yards is immediately determined. It remains to encode the nearest 333.33 yards to the appropriate resolution. Assume it is further required to display the synchro transmitter in increments of 10 yards. To do this, any 333.33-yard sector must be subdivided into 10-yard intervals. Thus, the rotational angle of the transmitting synchro is determined for 10 yards, 20 yards, 30 yards, etc., and an equivalent electrical angle is determined. For example, 10 yards would have an equivalent electrical angle of 10/333.33 multiplied by 60°. This electrical angle may be observed on the graph of FIGURE 10B. An attenuation is determined for this angle from the graph. The resistive attenuation of the first tap would correspond to the attenuation determined for this angle. Thus, $R1/R_t$=attenuation factor for 10/333.33 times 60°, as determined from the graph. Here $R_t$ is the total value of all attenuator resistances added $$(R1+R2 \ldots +R37)$$

shown in FIGURE 8. If the equivalent electrical angle of 10 yards happens to be the same angle for any system of units A to be displayed in B increments, then the attenuation provided by tap 1 (attenuation provided by R1) would be the required attenuation for that point. No new attenuation would have to be determined.

Reference to factor (b) requires consideration of the following: An attenuation of 10/333.33 times 60° is provided. Assume the remote transmitting synchro is at a rotation equivalent to 11/333.33 times 60°. System attenuation (due to imperfect electrical isolation, for example) effectively positions the transmitter at 9/333.33 times 60°. This last-mentioned value appears in the signal at the input to the resistive divider. Now, all electrical components (resistors of the attenuator, and comparator) make no new error, and are perfect. Since 9/333.33 times 60° is less than 10/333.33 times 60°, the result of intra-sector angle determination would be to choose the next lower attenuation. However, the next lower attenuation is 0/333.33 times 60° (since 10/333.33 times 60° is the lowest attenuation provided). Thus, the device (reading 0 for the intra-sector angle) would make an error of 11/333.33 times 60°. Since each increment to be displayed is 10/333.33 times 60° (in yards), the device has made an error of greater than one increment. To prevent this, the attenuation of 10/333.33 times 60° is placed at some lower attenuation. If the attenuation is placed at 5/333.33 times 60° (instead of 10/333.33 times 60°), the device will see 9/333.33 times 60° as greater than 5/333.33 times 60°, and the result of intra-sector angle determination would be to select the first tap. The states of all bistable elements are the same to select the first tap, irrespective of the value of the respective attenuation. Thus the state would be displayed as 10/333.33 multiplied by 60° (in yards), and since the original transmitted signal was 11/333.33 times 60°, an error of only 1/333.33 times 60° is made. This is much less than the smallest increment of 10/333.33 times 60°.

Figure 11:
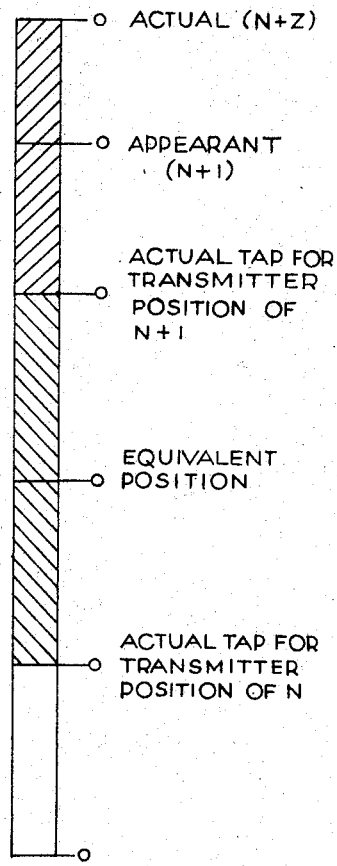
FIGURE 11 is a schematic representation of tap selection including error offset.

FIGURE 11 summarizes the tap location which includes the effect of error location. This is akin to rounding off the input so that if the transmitted position is 3.7, the device would display 4.0.

FIGURE 9 indicates the control necessary to select the appropriate taps. All taps are driven from the bistable elements of the registers. A given tap may be selected under a variety of conditions. Consider tap 26 (FIGURE 9). The notation $F_c$ (60+.3)+$M_c$2000 represents the 60-yard or 0.3° tap for the fine ($F_c$) synchros of range (yards) and bearing (degrees) and also represents the 2,000-yard tap of the coarse ($M_c$) synchro for range (yards). The inputs to the ratio decoder are the bistable register elements (both enabled and disabled sides), 224, 225, 226, 227, 228, 229, 230, 231 (coarse), and corresponding fine signals (not shown). In addition to the above, since it has been demonstrated that a given attenuation has differing significance depending upon whether the two-speed, three-speed, fine or coarse computation occurs, the control signals 3S (a three-speed program), 2S (two-speed program, $F_c$ (fine evaluation), $M_c$ (medium coarse evaluation), $C_c$ (coarse) are included. A typical example will suffice to demonstrate the gating function. Assume that the two-speed coarse evaluation is being performed. 2S and $M_c$ are operative, and $F_c$, 3S and $C_c$ are inoperative. Assume it has just been determined that the synchro is less than 40°. This was accomplished by making bistable element $F_m$ operative (thus selecting tap 24) (FIGURE 8), and receiving a signal from the comparator indicating that $E_{larger}$ (attenuated) is less than $E_{smaller}$. The signal ($\overline{E}$) causes $F_m$ to be made inoperative. Next $G_m$ is made operative. The following is now the condition of relevant elements:

(1). $G_m$, $\overline{E_m}$, $\overline{F_m}$, $\overline{H_m}$, and $\overline{I_m}$ are enabled.

(2). $\overline{G_m}$, $E_m$, $F_m$, $H_m$, and $I_m$ are disabled.

(3). $F_c$ being disabled will cause all gates operated by the fine synchro to be disabled. Gate 274 (FIGURE 9) will be inoperative (all inputs are inoperative). Inverter 275 makes this signal operative. Gate 276 has as one input the output of inverter 275. The other input to gate 276 communicates with a chain consisting of elements 277, 278, 279, 280 and 281. Since $M_c$ is enabled and $\overline{C_c}$ is enabled, gate 281 is enabled. Inverter 280 makes gate 281 disabled, 279 isolates the signal, and one input to gate 278 is disabled. Since $H_m$ and $I_m$ are disabled, gate 278 is disabled, and the output of inverter 277 is enabled. Thus, both inputs to gate 276 have been enabled, and gate 276 is therefore enabled. Inverter 282 disables this signal. The disabling signal is actually the required state to select an analogue gate, thus tap 12 has been selected. The state of the registers, having determined that 40° is not the proper position, now chooses tap 12 which is the 20° tap (one-half of the previously selected value). All other tap outputs are enabled, and thus only tap 12 is selected.

The two-speed stepper control and three-speed stepper control 21 determine when addition shall take place (FIGURE 12). The control consists of two bistable elements 283 and 284. Bistable element 283 determines when the coarse register shall pass its contents to the adder 31. This will occur at different times for the two-speed computation and the three-speed computation (see Table I). For the three-speed computation, addition commences at the ninth program step. If the device is performing a two-speed computation, the addition occurs from the eighth program step. Gates 285, 286 and 287 have appropriate conditions for setting bistable element 283. When the register is being adjusted (for numbers greater than 10) the bistable element 283 must be made inoperative, since adding should not continue while adjustment is taking place. The inoperative input side of bistable element 283 has the appropriate program step as its input (P12, P17, and P19). Bistable element 284 similarly controls the fine computation for both two-speed and three-speed.

Figure 13:
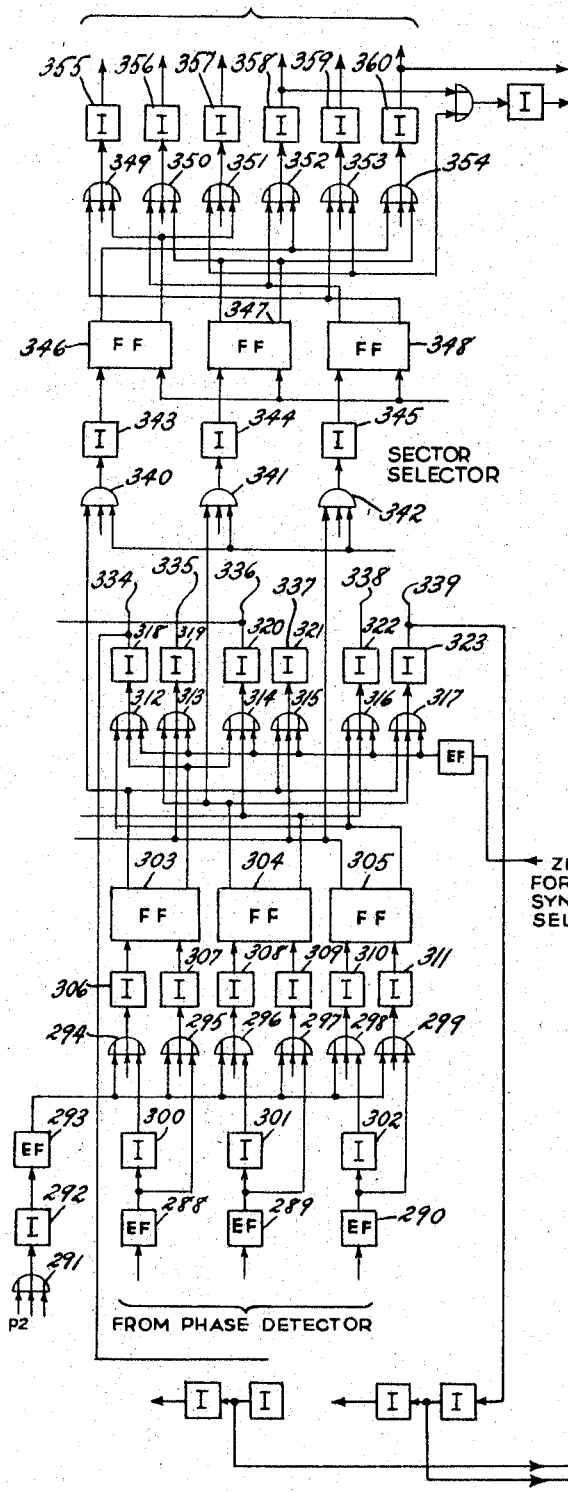
FIGURE 13 is a wiring diagram showing the sector selector and sector memory.

The sector selector 12 accepts inputs from the phase detector. These inputs are in the form of logic levels (enabled or disabled), depending upon whether the signal on the stator is in phase or out of phase with the reference signal. The sector selector translates this information into a particular sector. It then stores this information for the subsequent processing of the data, e.g., for use in the ratio selector, ambiguity zero force, and to control the fixed number generator. The sector selector 12 is shown in FIGURE 13 in the drawings.

The inputs from the phase detector 11 enter through isolation elements 288, 289 and 290. Program pulse P2 enables gate 291, which causes inverter 292 to be disabled. Element 293 isolates this signal from gates 294, 295, 296, 297, 298 and 299. Inverters 300, 301 and 302 provide the inverse of the signals from the phase detector. Both the signal and its corresponding inverse signal are required to enter the data into bistable elements 303, 304 and 305. The data are entered at program pulse 2 (see Table I). Since the synchro selector selects the coarse synchro during this time, the coarse sector is the sector being stored.

The data are entered into bistable elements 303, 304 and 305 in accordance with Table VII, in which character "X" indicates states which are not relevant.

TABLE VII

| Sector | Relative Phases | | | State of Bistable Element | | |
|---|---|---|---|---|---|---|
| | ST1 | ST2 | ST3 | 303 | 304 | 305 |
| 1 | + | + | − | 1 | X | 1 |
| 2 | + | − | − | X | 0 | 0 |
| 3 | + | − | + | 1 | 1 | X |
| 4 | − | − | + | 0 | X | 0 |
| 5 | − | + | + | X | 1 | 1 |
| 6 | − | + | − | 0 | 0 | X |

The data are entered via gates 294 through 299 and inverters 306, 307, 308, 309, 310 and 311. Gates 312, 313, 314, 315, 316 and 317, in conjunction with inverters 318, 319, 320, 321, 322 and 323, allow the states of elements 303, 304 and 305 to enable one of the lines 334, 335, 336, 337, 338 or 339 in accordance with the sector to which the shaft is rotated. The particular line being enabled is in accordance with Table VIII.

TABLE VIII

| Sector | State of Bistable Element | | | Line Enabled |
|---|---|---|---|---|
| | A | B | C | |
| 1 | 1 | X | 1 | 334 |
| 2 | X | 0 | 0 | 335 |
| 3 | 1 | 1 | X | 336 |
| 4 | 0 | X | 0 | 337 |
| 5 | X | 1 | 1 | 338 |
| 6 | 0 | 0 | X | 339 |

These lines indicate the sector in which the shaft of the transmitter is located. At program pulse interval P4, the data from the sector selector 12 (bistable elements 303, 304 and 305, storing coarse sector data) are transferred through gates 340, 341 and 342, and inverters 343, 344 and 345, into bistable elements 346, 347 and 348. Gates 349, 350, 351, 352, 353 and 354 and inverters 355, 356, 357, 358, 359 and 360 perform the same function as gates 312 and 317, and inverters 318 through 323. The proper sector line controls the fixed number generator 22. The sector selector 12, which has now transferred its coarse data into the sector memory 13, is now ready to accept new data. At program pulse 10, new data from the phase detector 11 is entered into the bistable elements 303, 304 and 305. These data are the fine synchro data, since the inputs to the device have been switched from the coarse synchro to the fine synchro, and the phase detector 11 is operative on the fine synchro data. For the remainder of the program (two-speed or three-speed), the sector selector stores the fine synchro sector data. This drives the fixed number generator to determine the fine sector number.

Figure 14:
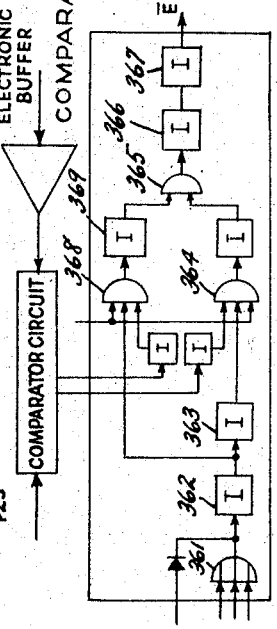
FIGURE 14 is a schematic wiring diagram showing the comparator and comparator logic.

The comparator 34 is shown in FIGURE 14. This element includes an electronic buffer for isolation, as well as the comparator circuit which includes the components necessary to determine whether (a) $E_{larger}$ is equal to or less than $E_{smaller}$; and
(b) $E_{larger}$ is greater than $E_{smaller}$.

In addition, the comparator contains additional gates to determine whether a signal corresponding to (a) or (b) shall be sent to the registers. These latter gates are required due to the following consideration. The signals which reach the comparator are always of the same polarity, e.g., the comparator determines only the relative value of two absolute signals. In sector 1, for example, both $E_{larger}$ and $E_{smaller}$ are negative at the input to the comparator. If the ratio selected by the ratio selector 15 is too large, then $E_{smaller}$ will be more positive than the attenuated $E_{larger}$. In sector 2, if the same situation exists, $E_{smaller}$ would be more negative than $E_{larger}$. In either case, however, it is necessary to reduce the ratio. The comparator would put out signals of opposite sense for the above two cases, and yet the same reduction (of ratio) is required in each sector. Thus, the signal sent to the registers (to increase or decrease the count in the registers) must be modified in accordance with the sector information. Two signals may come from the comparator ($\overline{E_n}$ and $\overline{E_p}$). These signals are the inverse of each other. Thus, the true answer and the inverse of the true answer exist simultaneously. In either sectors 1, 3 or 5, gate 361 and inverters 362 and 363 enable gate 364. This allows the $\overline{E_n}$ signal to pass through gate 365, inverters 366 and 367, to the output ($\overline{E}$). In sectors 2, 4 or 6, gate 361 is disabled, and hence gate 364 (through inverters 362 and 363) is disabled. However, gate 368 is enabled in these sectors, and hence $\overline{E_p}$ passes through gate 368, inverter 369, and gate 365, inverters 366 and 367, and is the $\overline{E}$ signal.

Figure 15:
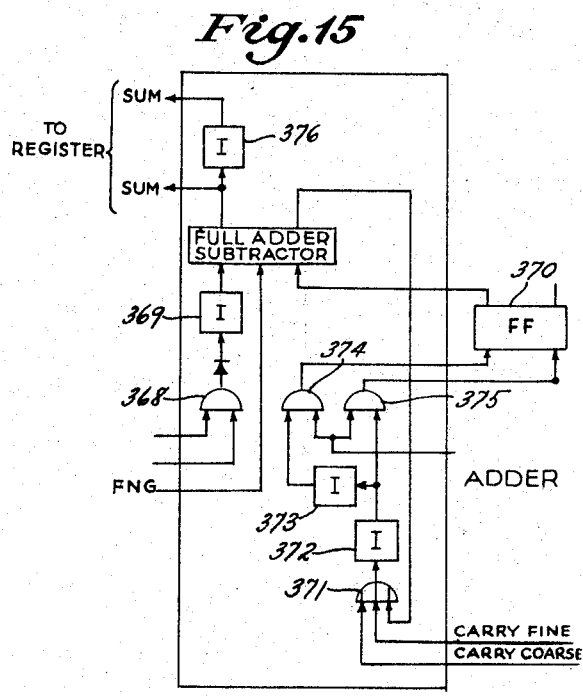
FIGURE 15 is a schematic wiring diagram of the adder.

The adder 29 is illustrated in FIGURE 15. It is a conventional logical element. The inputs to be added are FNG (a number representing the engineering equivalent of the sector number which is received from the fixed number generator) and the number stored in the registers (either coarse, $\overline{N_m}$, or fine, $\overline{N_f}$) after the intra-sector angle determination. The register data enters the adder through gate 368 and inverter 369. These elements, in combination, allow either $\overline{N_m}$ or $\overline{N_f}$ to enter the adder. Bistable element 370 contains the carry which may result from one of these sources. The addition of two numbers can result in a carry to a more significant place. This addition must be stored in a serial adder until the next most significant digits are added. This information is stored in bistable element 370. In addition, as was indicated previously, when adjusting the registers for numbers greater than 10, a carry will be generated. This carry will be stored through elements 371, 372, 373, 374 and 375 in bistable element 370. The sum is restored in the registers via inverter 376.

Figure 16A:
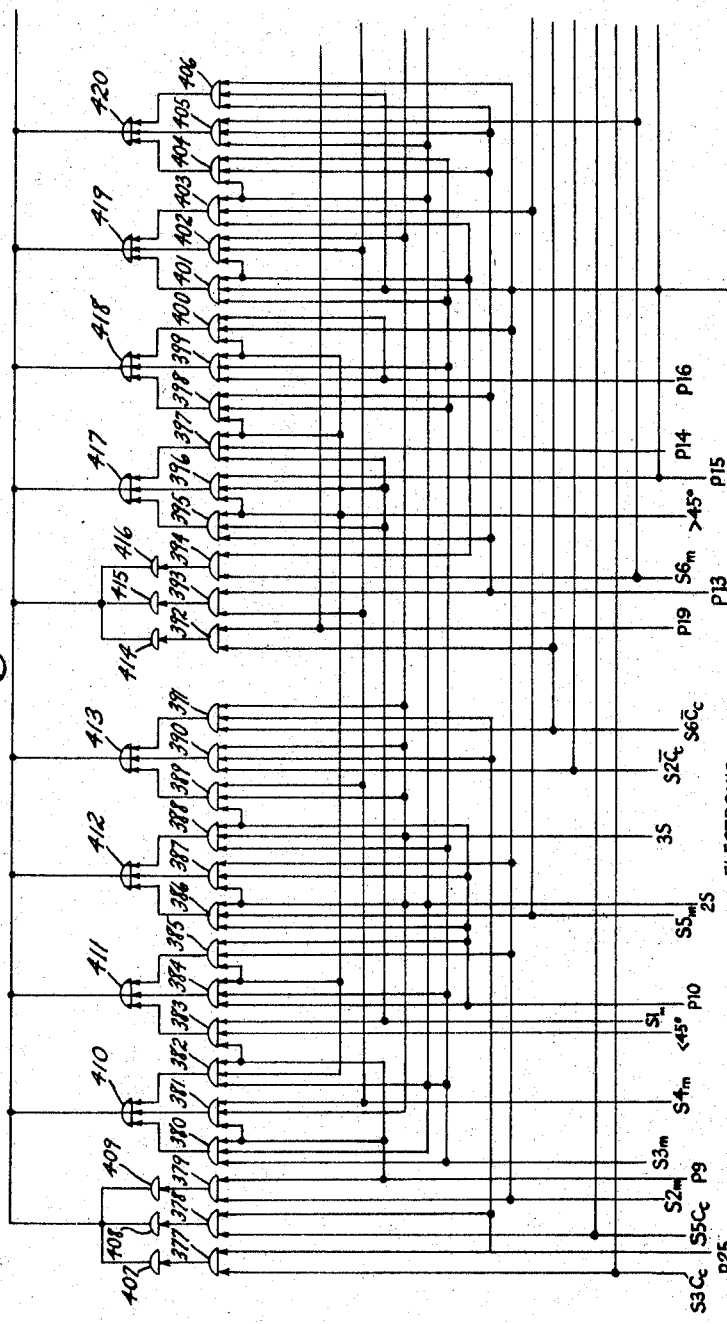
FIGURES 16A and 16B are a schematic wiring diagram of a fixed number generator.
Figures 16B, 17:
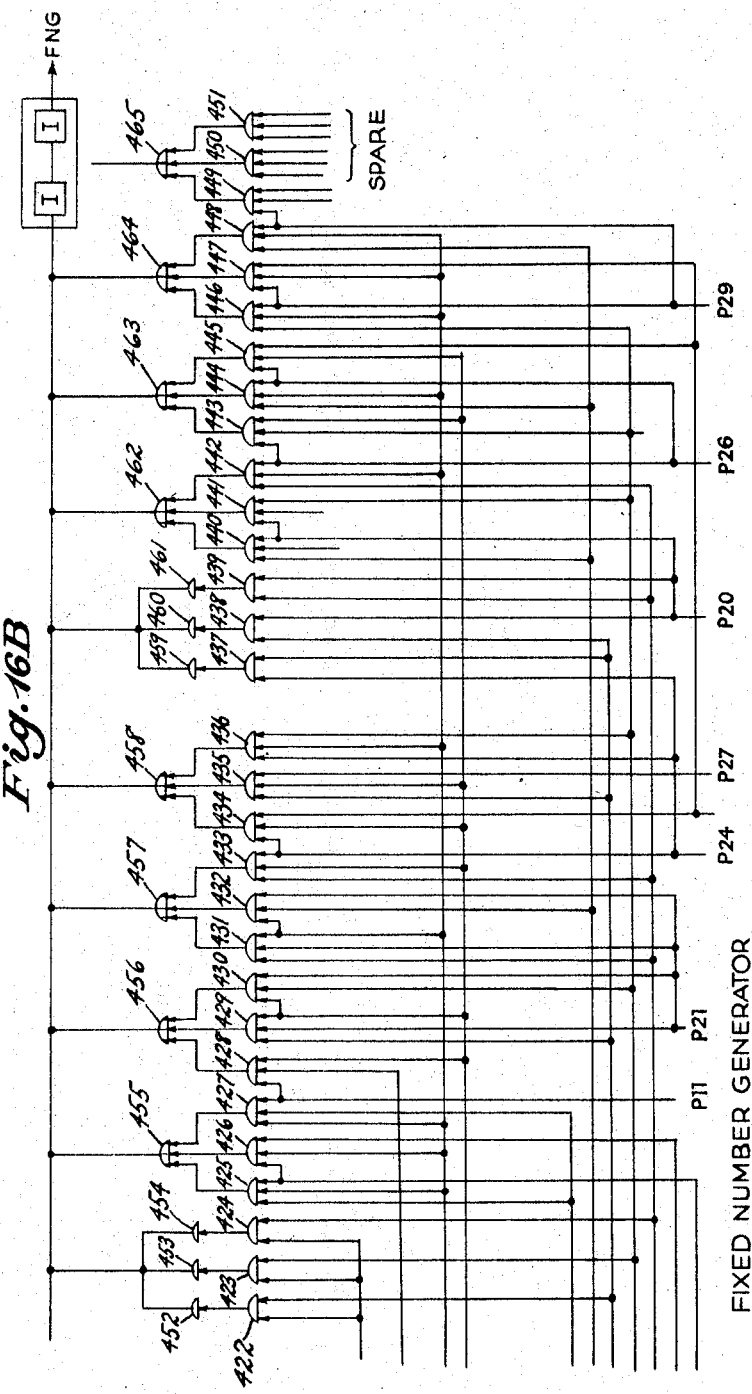
FIGURE 17 is a schematic wiring diagram of the two- and three-speed coarse, medium and fine control.

The fixed number generator 22 (FIGURES 16A and 16B) has as its input a series of pulses from the program pulse generator 19, control signals from the sector selector 12, and a control signal indicating when the three-speed transmitters are transmitting a signal greater than 72,000 yards (one turn of the medium synchro). The output of the fixed number generator is a single line. On this line, in time sequence, is a binary coded signal which represents the engineering quantity for each sector of the two-speed or three-speed transmitters.

Tables IX and X summarize the binary sequence generated by the gates 377 through 465.

TABLE IX.—FIXED NUMBER GENERATOR

| Sector | Speed | Binary | Sequence | Decimal Engineering Equivalent |
|---|---|---|---|---|
| 1 | 2 coarse | 0000 | 0000 | 0 degrees. |
| 2 | do | 0000 | 0110 | 60 degrees. |
| 3 | do | 0001 | 0010 | 120 degrees. |
| 4 | do | 0001 | 1000 | 180 degrees. |
| 5 | do | 0010 | 0100 | 240 degrees. |
| 6 | do | 0011 | 0000 | 300 degrees. |
| 1 | 3 coarse | 0000 / 0111 | 0000 / 0010 | } 0 yds., or 72,000 yds. |
| 2 | do | 0001 / 1000 | 0010 / 0100 | } 12,000 yds., or 84,000 yds. |
| 3 | do | 0010 / 1001 | 0100 / 0110 | } 24,000 yds., or 96,000 yds. |
| 4 | do | 0011 | 0110 | 36,000 yds. |
| 5 | do | 0100 | 1000 | 48,000 yds. |
| 6 | do | 0100 | 0000 | 60,000 yds. |

The first three sectors of the three-speed coarse depend upon whether it has been determined that the coarse speed synchro is transmitting greater than 72,000 yards.

TABLE X.—FIXED NUMBER GENERATOR

| Sector | Speed | Binary | Sequence | Decimal Engineering Equivalent |
|---|---|---|---|---|
| 1 | 2 fine | 0000 | 0000 | 0 degrees. |
| 2 | do | 0001 | 0111 | 1.7 degrees. |
| 3 | do | 0011 | 0011 | 3.3 degrees. |
| 4 | do | 0101 | 0000 | 5.0 degrees. |
| 5 | do | 0110 | 0111 | 6.7 degrees. |
| 6 | do | 1000 | 0011 | 8.3 degrees. |
| 1 | 3 fine | 0000 | 0000 | 0 yards. |
| 2 | do | 0011 | 0011 | 330 yards. |
| 3 | do | 0110 | 0110 | 660 yards. |
| 4 | do | 0000 | 0000 | 1,000 yards. |
| 5 | do | 0011 | 0011 | 1,330 yards. |
| 6 | do | 0110 | 0111 | 1,670 yards. |

Bistable element 480 (FIGURE 20) stores the fact that the coarse speed of the three-speed synchro is transmitting greater than 72,000 yards. The gates are so arranged that the binary sequence will appear at the output of the fixed number generator at the same instant that the corresponding number (or binary coded decimal value) from the register is being transferred to the adder. These time intervals are outlined in the program (Table I).

The two/three-speed coarse, medium, fine control 20 (FIGURE 17) share the same bistable elements. This element has six control lines. These lines determine which of the remote synchro transmitters shall be connected to the computing elements, and control the analogue gates of the two/three-speed synchro selector 10. To perform these functions, two bistable elements and eight logic elements are required. The sequence of operation begins at the 30th program interval which sets both bistable elements 467 and 468. Element 467 enables the $C_c$ line. This action connects the coarse transmitter stators to the computing elements. During program pulse 1, a determination is made on the coarse three-speed transmitter to determine if it is transmitting more than 72,000 yards (more than one turn of the coarse transmitter). At the end of program pulse 1, element 467 is reset, since the coarse speed is no longer required. Following this, one of the four gates 469, 470, 471 and 472 will be enabled. Since element 468 has been previously enabled, only gates 469 and 470 can possibly be enabled. Gates 471 and 472 are disabled since the disabling side of element 468 is one of the inputs of each of these gates.

If the program is in the three-speed computation, a signal on the 3S line from the sampling oscillator 18 will cause both inputs on gate 470 to be enabled. With the enablement of gate 470, inverter 473 causes a disabling signal on the line $\overline{MC.3S}$. A presence of a disabling signal on this line (all other lines being enabled) will control the analogue gates corresponding to the three-speed coarse transmitter. At program pulse 7, element 468 is reset. Thus, gate 470 is now disabled and gate 472 is enabled, since both inputs are now enabled. This causes a disabling signal on $\overline{Fc.3S}$ which controls the fine three-speed synchros. At program step 30, element 468 is again enabled. Now, however, the 3S line from the sampling oscillator 18 is disabled and the 2S line is enabled. Gate 469 is then enabled and the control allows coarse two-speed information to pass to the computing elements. Finally, at program step 7, gate 471 is enabled, allowing the two-speed fine data to be encoded.

Figure 18:
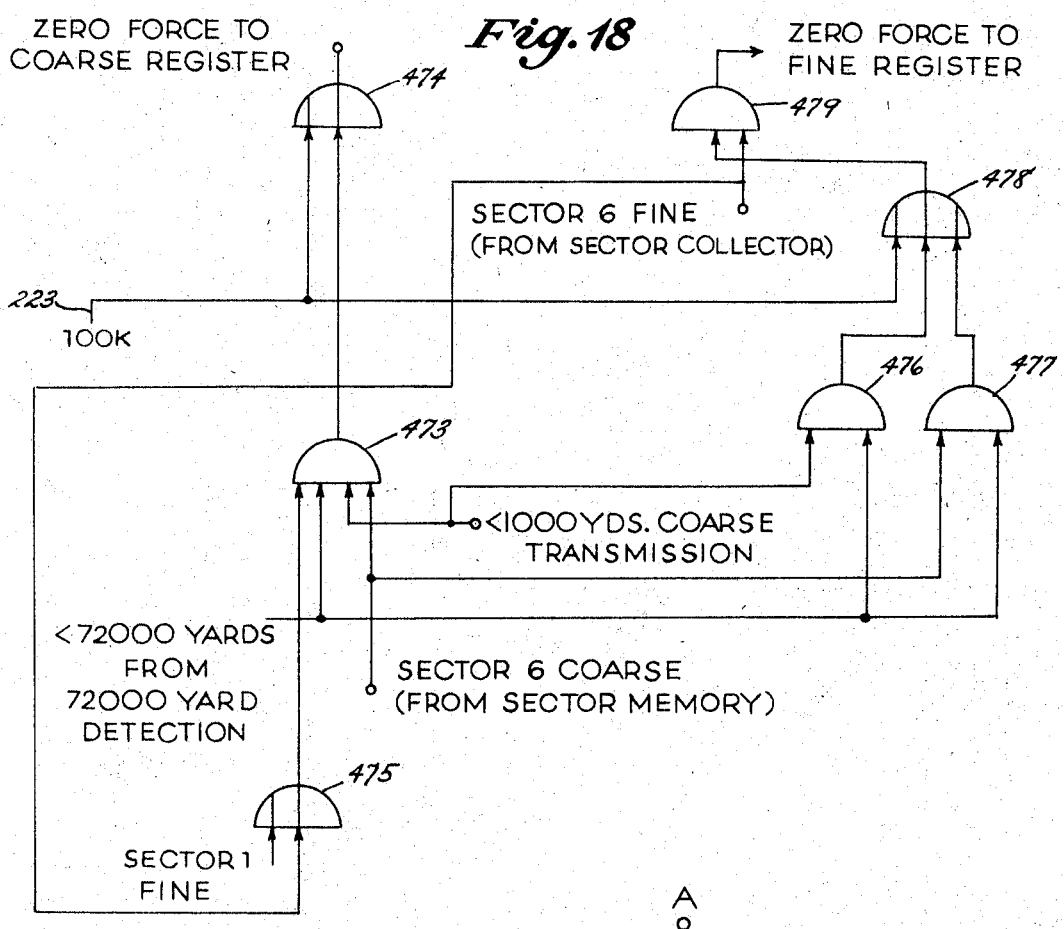
FIGURE 18 is a schematic wiring diagram showing a zero force control detector.
Figure 19:
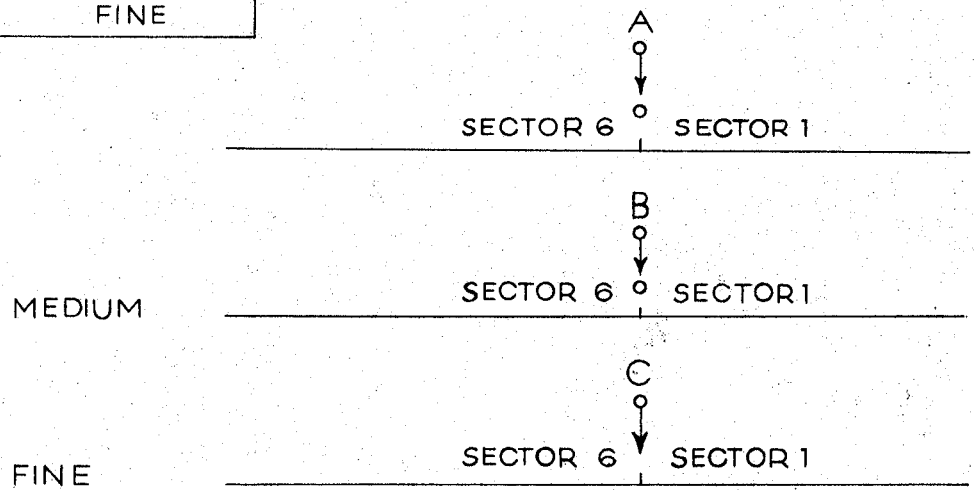
FIGURE 19 is a schematic illustration of a zero force problem.

The zero force control detector 14 is shown in FIGURE 18 in the drawings, and is used in two-speed or three-speed evaluation to detect the conditions for zero inputs, and clears the proper registers to avoid possible ambiguities described hereinabove. First, the device is required to encode three-speed data to a value less than the maximum possible transmitted value, although this feature is applicable even if the maximum possible transmitted value were to be encoded. Referring to FIGURE 19, there is indicated a graphic representation of an ambiguity problem. Indicated are the coarse, medium, and fine transmitted scales persented on a linear scale. The arrows A, B and C represent the position of the respective transmitted scales presented on a linear scale. The arrows A, ing line (arrow) can be in one of two sectors, there are eight possible positions for the transmitters to transmit. This is outlined in Table XI.

TABLE XI

| Condition | Arrow A Sector | Arrow B Sector | Arrow C Sector | Intended Transmission |
|---|---|---|---|---|
| 1 | 1 (<72 K yds.) | 1 | 1 | A small transmission. |
| 2 | 1 (<72 K yds.) | 1 (<1,000 yds.) | 6 | Zero. |
| 3 | 1 (<72 K yds.) | 6 | 1 | A small transmission. |
| 4 | 1 (<72 K yds.) | 6 | 6 | Zero. |
| 5 | 6 | 1 | 1 | A small transmission. |
| 6 | 6 | 1 | 6 | Zero. |
| 7 | 6 | 6 | 1 | A small transmission. |
| 8 | 6 | 6 | 6 | Zero. |

In each condition (1 through 8), action must be taken to assure that a gross error will not be encountered. Wherever a small legitimate transmission is intended, precaution must be taken to reset the coarse three-speed register and allow only the fine register to display its contents. (The term "resetting" is intended to mean the forcing of all elements of that particular register to the non-operative state.) There are thus two actions which must be performed:

(1) Reset the coarse register only.
(2) Reset both fine and coarse registers.

Thus, when the result of a three-speed program enables bistable element 223 (coarse register), a result of a greater than 100,000 yards is detected. This will force the coarse register to zero since the device is intended to encode only up to 100,000 yards. The other condition in which the coarse register is reset occurs when less than 72,000 yards is detected, and the fine synchro is in either sector 1 or 6, the coarse synchro is in sector 6, and the result of a coarse computation indicates less than 1,000 yards transmitted. These conditions are accommodated by gates 473, 474 and 475, which provide the reset control for the coarse register. The fine register reset control is accomplished by gates 476, 477, 478 and 479. The fine register is not reset unless the fine synchro is in sector 6. Thus, misalignments of more than one sector on the fine synchro are not permitted. Gates 476 and 477 control the other conditions which cause the resetting of the fine register. One of these conditions (controlled by gate 476) is the occurrence of less than 1,000 yards medium transmission and less than 72,000 yards coarse transmission. The other condition, controlled by gate 477, is the occurrence of less than 72,000 yards coarse transmission and where the medium synchro is in sector 6. Gates 476 and 477 will be enabled by either set of conditions, and therefore so will gate 478. The other input of gate 479 will be enabled, and the fine register will be reset.

Figure 20:
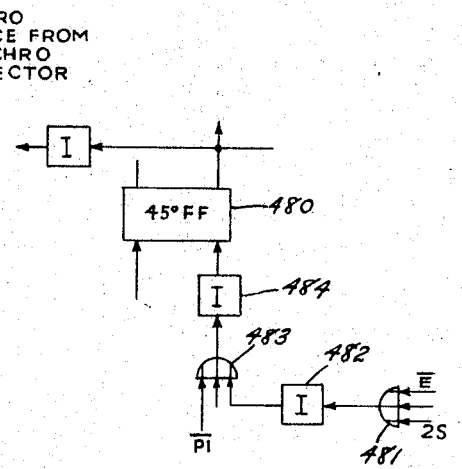
FIGURE 20 is a schematic wiring diagram showing means employed for detection of range in yards.

Referring to FIGURE 20 in the drawings, there is shown the auxiliary logic required to determine whether the coarse transmitter is transmitting an angle equivalent to greater than 72,000 yards. If this is so, then either a zero force condition will occur, or if the coarse synchro is in sector 1, 2 or 3, then the transmitters are attempting to transmit a value between 72,000 yards and 100,000 yards (the total capacity in yards of the device).

At program pulse 30, bistable element 480 (45° FF) is set. At the same instant, the coarse synchro is gated to the device, so that its position will be detected. If, during program pulse 1, the 72,000-yard tap on the decoder indicates that the synchro is transmitting less than 72,000 yards, an $\bar{E}$ signal will be generated in the comparator. This appears as an input to gate 481. If the device is performing a three-speed computation, then the other input to gate 481 (2S) will be disabled. Thus, gate 481 will be enabled. Inverter 482 causes this signal to be disabled. Gate 483 is caused to become disabled (since $\overline{P1}$, the inverse of program pulse 1, is a disabling signal). Inverter 484 enables this signal, resetting bistable element 481. If the coarse transmitter were transmitting a signal greater than 72,000, then no $\bar{E}$ signal would be generated, and the bistable element 480 would not be reset, leaving it in the greater-than-72,000-yard condition.

The device displays the result of its computation in any suitable manner, and preferably by an electroluminescent panel of a type well-known in the art. To accomplish this, the coarse register controls two digits, and the fine register controls two additional digits. The fifth digit will be zero, and is permanently displayed for the convenience of the user, as the device will normally function to register accurately to the nearest ten yards of measurement, or the nearest six minutes of angular measurement.

The outputs of the coarse and fine registers are binary coded decimal numbers, and each digit requires four significant bits of information for determination. Thus, eight lines (four for the code and four for the inverse of the code) are required.

The readout drives are illustrated in FIGURE 21 in the drawings, wherein drivers 491, 492, 493, 494, 495, 496 are controlled by driver controls 497 and 498, the former being a three-speed readout driver control and the latter a two-speed readout driver control. Drivers 499, 500, 501, 502, 503 and 504 are similarly controlled by driver controls 505 and 506, the former being a three-speed readout driver control and the latter being a two-speed readout driver control. Drivers 507, 508, 509 and 510 complete the sixteen drivers required to provide the necessary four significant bits of information for each digit, drivers 511 and 512 being spares. Drivers 507–510 are controlled by driver controls 513 and 514, again from the three-speed readout driver control and two-speed readout driver control. Signals for enabling the controls 497, 498, 505, 506, 513 and 514 are received from the sampling control at half-second intervals, and enable the drivers to receive information from the registers and transmit them to the respective decoders.

We wish it to be understood that we do not consider the invention limited to the precise details of structure shown and set forth in this specification, for obvious modifications will occur to those skilled in the art to which the invention pertains.

We claim:
1. In a synchro digital converter, including a multi-speed synchro transmitter having coarse and fine speed synchros, transmission gates disposed in the stator leads of said transmitter, a phase detector connected to each of said stator leads, ratio decoding means, sector selector circuitry, and means for digitizing the output of said sector selector circuitry and said ratio decoding means as a multi-speed function, said ratio decoding means including a plurality of resistive taps, each corresponding to an attenuation point indicative of instantaneous rotational position of said synchro transmitter, the improvement comprising means for selecting one of said taps based upon the detection of ambiguity existing between said fine and coarse speed synchros; said last-mentioned means including means for examining the position of the coarse synchro to determine whether it has passed through an index designating a submultiple corresponding to a complete rotation of said fine synchro, means for subsequently examining the position of the fine synchro to determine whether it has passed the index indicating a complete rotation thereof, and means for selecting a resistive tap corresponding to the position of said fine synchro.

2. Structure in accordance with claim 1 including coarse, medium and fine speed synchros, employed during at least one conversion operation thereof, said last-mentioned means examining the position of the medium synchro to determine whether it has passed an index corresponding to a submultiple equivalent to a complete rotation of said fine synchro, and means for subsequently examining the position of the fine synchro to determine whether it has passed the index indicating a complete rotation thereof, and means for selecting a resistive tap corresponding to the position of said fine synchro.

References Cited

UNITED STATES PATENTS

| | | | |
|---|---|---|---|
| 2,779,539 | 1/1957 | Darlington | 235—61 |
| 2,946,044 | 7/1960 | Bolgiano et al. | 340—174 |
| 3,023,959 | 3/1962 | Rabin et al. | 235—154 |

DARYL W. COOK, Acting Primary Examiner.

MAYNARD R. WILBUR, Examiner.

A. L. NEWMAN, Assistant Examiner.